United States Patent [19]

Erman et al.

[11] Patent Number: 5,058,972
[45] Date of Patent: Oct. 22, 1991

[54] INTEGRATED SEMICONDUCTOR DEVICE INCLUDING AN OPTOELECTRONIC SWITCHING ELEMENT

[75] Inventors: Marko Erman; Philippe Autier, both of Paris, France

[73] Assignee: U.S. Philips Corp., New York, N.Y.

[21] Appl. No.: 439,140

[22] Filed: Nov. 17, 1989

[30] Foreign Application Priority Data

Nov. 25, 1988 [FR] France ............................... 88 15426
Dec. 30, 1988 [JP] Japan ................................. 88 17497

[51] Int. Cl.$^5$ .............................................. G02B 6/10
[52] U.S. Cl. ........................................ 385/17; 385/16; 385/130
[58] Field of Search .......................... 350/96.12, 96.13

[56] References Cited

U.S. PATENT DOCUMENTS 4,784,451 11/1988 Nakamura et al. ............. 350/96.14
4,832,430 5/1989 Tada ................................. 350/96.14

Primary Examiner—William L. Sikes
Assistant Examiner—Robert E. Wise
Attorney, Agent, or Firm—William L. Botjer

[57] ABSTRACT

An integrated semiconductor device including at least one optoelectronic switching element, which comprises:
two rectilinear monomode optical guides crossing each other at an angle $2\theta$ composed of at least one heterostructure of III-V material, which comprises a substrate S of a confinement material and a guiding layer $C_G$ as well as a guiding strip RB,
a p-n junction formed in the crossing region asymmetrically with respect to the bi-secting longitudinal plane of the crossing angle,
characterized in that the longitudinal dimension of the p-n junction largely exceeds that of the crossing region, and in that the p-n junction is arranged so as to project symmetrically on either side of this region in this longitudinal direction.

21 Claims, 16 Drawing Sheets

INTEGRATED SEMICONDUCTOR DEVICE INCLUDING AN OPTOELECTRONIC SWITCHING ELEMENT

BACKGROUND OF THE INVENTION

Description

The invention relates to an integrated semiconductor device including at least one optoelectronic switching element, this element comprising:

two rectilinear monomode optical guides crossing each other at a given angle composed of at least one heterostructure of III-V material, which comprises a substrate S of a confinement material and a guiding layer $C_G$ as well as a guiding strip RB;

a p-n junction formed in the crossing region asymmetrically with respect to the bi-secting longitudinal plane of the crossing angle.

The invention is used in the formation of optical switching matrices of N guides in N guides for optoelectronic and telecommunication systems.

The invention further relates to a switching matrix formed by means of these elements and to a method of manufacturing a semiconductor device including such a matrix.

Such a switching element is known from U.S. Pat. No. 4,784,451. This document describes various switching elements of the charge carrier injection type, whose operation is improved by the presence of a current limiting structure. These switching elements comprise two wave guide sections enclosing a given angle with each other. These guides are integrated on a substrate and are formed from a guiding layer disposed between two confinement layers, which consist of a material having a greater forbidden band width and a lower refractive index. One of the confinement layers has one conductivity type and the guiding layer has the opposite conductivity type so as to form a p-n junction. On the other hand, Zn ions are implanted into each of the confinement layers to form the current-limiting structure. This structure limits a zone in the guiding layer in which the index is changed by the injection of the charge carriers.

In an embodiment, the switching element has, viewed from above, the form of a Y. The p-n junction is formed through a rectilinear guide, at one end of which the input is formed, while at its other end the output is formed in the passive mode, the output being obtained by a second branch of the Y in the active mode. In the latter mode, by change of index in the zone of the guiding layer, the light entering at the end designated as input of the rectilinear guide is reflected towards the second branch of the Y.

One of the electrodes controlling the switching operation is disposed asymmetrically at the surface of the Y, one of its edges being aligned with respect to the bisectrix of the angle of the two output branches. This electrode does not project beyond the width of the guides.

The current-limiting structure is such that it has two zones implanted at the upper part of the substrate and mutually separated by a distance about equal to the transverse dimension of the upper electrode and that it moreover has a zone implanted into the upper confinement layer and located substantially under the upper electrode. The lower electrode is disposed on the opposite surface of the substrate, the latter being conducting. The light is guided due to the fact that a mesa is formed at the surface of the substrate including the guiding layer and the upper layers.

In another embodiment described in the same aforementioned document, the switching element has the form of an X. The upper electrode has the form of a strip arranged parallel to the bisectrix of the small joining angle of the branches of the X. In this case, the substrate is provided at its surface with a layer of a conductivity type opposite to that of the guiding layer having the form of a strip disposed along the same axis as the upper electrode, i.e. parallel to the bisectrix of the joining angle of the brancehs of the X. Since said layer is at one level with the upper part of the substrate, electrodes of a conductivity type opposite to that of the upper electrode are disposed at each end of the said layer. A region implanted by means of Zn ions is disposed substantially under the upper electrode in the upper confinement layer. The upper electrode has a length smaller than that of the diagonal of the junction. It is disposed symmetrically on the element in the form of an X and its lateral dimension is not negligible. The lower part of the current-limiting structure in this case does not include regions implanted by means of Zn ions in the substrate, which is semi-insulating, due to the presence of the strip of a first conductivity type provided with the electrodes at each of its ends.

These structures mainly have the disadvantage that the reflecting surface formed by the region of modified index due to the injection of charge carriers by means of the p-n junction does not exhibit sufficiently large dimensions to receive all the incident beams and to reflect them. This results in the leakage of an evanescent wave at each end of the central region of the switching element, especially in the active mode.

Moreover, the different regions of the current-limiting structure are only approximately aligned due to the fact that they are formed by implantation of Zn ions at two levels. By this method, it is very difficult to align the edge of a second region at an upper level. The reflecting surface is therefore only approximately disposed.

A disadvantage of the known switching elements for the present application in telecommunication is that they are not monomode elements. More particularly, even if the dimensions of these elements are transposed to obtain the propagation of a monomode wave in the input guide(s), the arrangement of the upper electrode in the element in the form of an X admits the excitation of complicated modes. In fact, the reflecting surfaces do not coincide with the bisectrix of the joining angle which is optically unfavourable for the reflection Losses in the active mode also result therefrom.

On the other hand, the optical guides of the known devices are composed of a guiding layer disposed in a mesa between two confinement layers. Such a structure is subjected to losses by lateral diffusion through the walls, which are very substantial.

It should further be noted that the adoption of a substrate of the n-type is not only a disadvantage for the manufacture of a current-limiting structure, but also for the manufacture of optoelectronic devices in manufacturing synergy with that of other (active integrated elements, such as field effect transistors.

The known devices are therefore anything but optimized both in the active and in the passive mode.

It will be taken into account that for applications in the field of telecommunication it must be possible to realize switching matrices operating at the wavelength of 1.3 or 1.55 μm, transporting monomode signals and having a large number of switching elements. Therefore, losses that may seem small when considering a single switching element become redhibitory when a whole matrix is utilized.

SUMMARY OF THE INVENTION

Therefore, one of the objects of the invention is to provide a switching element whose performances are improved both in the transmission mode, i.e. when the junction is passive, and in the switching mode, i.e. when the junction is active so that the losses are reduced, that is to say that the output power is as equal as possible to the input power; so that the extinction on the unused output path is at least equal to 30 dB; and so that it is thus possible to obtain balanced outputs, which is particularly important for the application in a whole matrix.

An object of the invention is therefore to provide a really monomode switching element, which during the application of a current density to the p-n junction permits of obtaining by injection of charge carriers a really abrupt reduction of the refractive index in the junction region resulting in the formation of a very localized reflecting plane so as to permit the total internal reflection of a beam introduced into the guide situated in the zone opposite to the zone occupied by the junction in line with the adjacent guide.

The other objects of the invention are to provide a switching element, whose manufacturing method is in synergy with that of other integrated circuits, i.e. whose substrate can be semi-isolating, which is really monomode, whose dimensions are reduced and therefore lead to switching matrices having a small surface, particularly favourable for the integration at high density, which can be carried out in a simple manner and is therefore inexpensive.

These objects are achieved by means of a switching element of the kind described in the opening paragraph and moreover characterized in that the longitudinal dimension of the p-n junction largely exceeds that of the crossing region, and in that the p-n junction is arranged so that it projects symmetrically from either side of this region in this longitudinal direction.

In these conditions, the losses by evanescence at each end of the crossing region are avoided.

In an embodiment of the invention, this device is characterized in that the substrate S is semi-isolating and the p-n junction is formed by two layers $C_1$ and $C_2$, respectively, of the n- and p-conductivity type, arranged on either side of the guiding layer $C_G$ and in close proximity thereof, each having an edge BB' in coincidence with the bisecting longitudinal plane YY' of the crossing angle $z\theta$.

In these conditions, the current-limiting structure has a higher performance than the structure known from the aforementioned document. Moreover, since it is arranged rigorously in coincidence with the plane of symmetry of the crossing angle, the reflecting plane is situated in an optical position which is ideal to produce the total internal reflection in a single reflection. It is noted that in the second mentioned embodiment, the reflecting surfaces due to the p-n junction are shifted laterally with respect to the bi-secting plane. Moreover, the device according to the invention is in manufacturing synergy with other devices due to the semi-isolating substrate.

In an embodiment, this device is characterized in that it comprises a second heterostructure composed of the guiding layer $C_G$ and of an upper layer of a confinement material.

This embodiment permits of minimizing the losses both in the switching element in the transmission mode when the junction is passive and in each guide part connecting an element to another to constitute a whole matrix.

In an embodiment, this device is characterized in that the guiding strip is erected above the heterostructure.

In these conditions, it is possible to obtain narrow and thus rigorously monomode guides, a very accurately localized reflecting plane as well as an equivalent transmission coefficient on one or the other of the output guides in the cases in which the junction is active or passive.

In a preferred embodiment, the substrate and the upper confinement layer are made of InP, the guiding layer is made of $Ga_xIn_{1-x}As_yP_{1-y}$, where:

$y \approx 0.5$, $x = 0.435\ y$, $a \approx 4$ μm (thickness of the guiding layer)

$e_G = 0.4$ μ (transverse dimension of the strip of the guides), $2\theta \approx 4°$ (crossing angle), $e_3 \approx 0.25$ to $0.60$ μm (thickness of the upper confinement layer outside the strip), $H = h + e_3 \approx 1$ μm (thickness of confinement material in the region of the strip R).

In these conditions, it is found that these values are optimum both in the active and in the passive mode. The beam does not tend to be distributed between the two output guides both in the passive and in the active mode. The switching element is truly optimized in one and the other of its modes of operation.

BRIEF DESCRIPTION OF THE DRAWINGS

The invention will be more clearly understood by means of the following description illustrated diagrammatically by the accompanying Figures, of which.

DETAILED DESCRIPTION OF THE PREFERRED EMBODIMENT

Example I

Figure 1A:
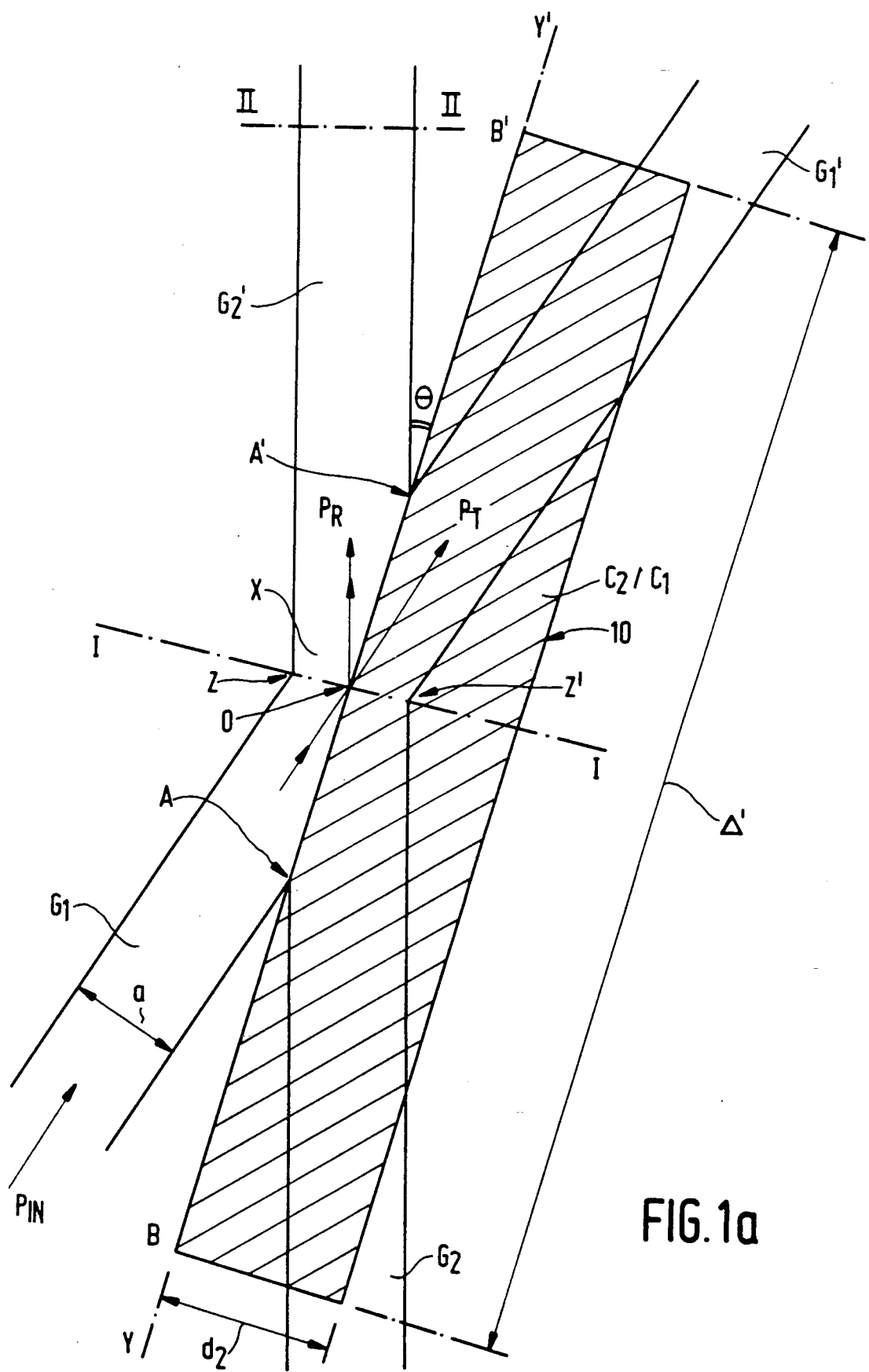
FIGS. 1a and 1b show an element in the form of an X, viewed from above, which is described in Example I.
Figure 1B:
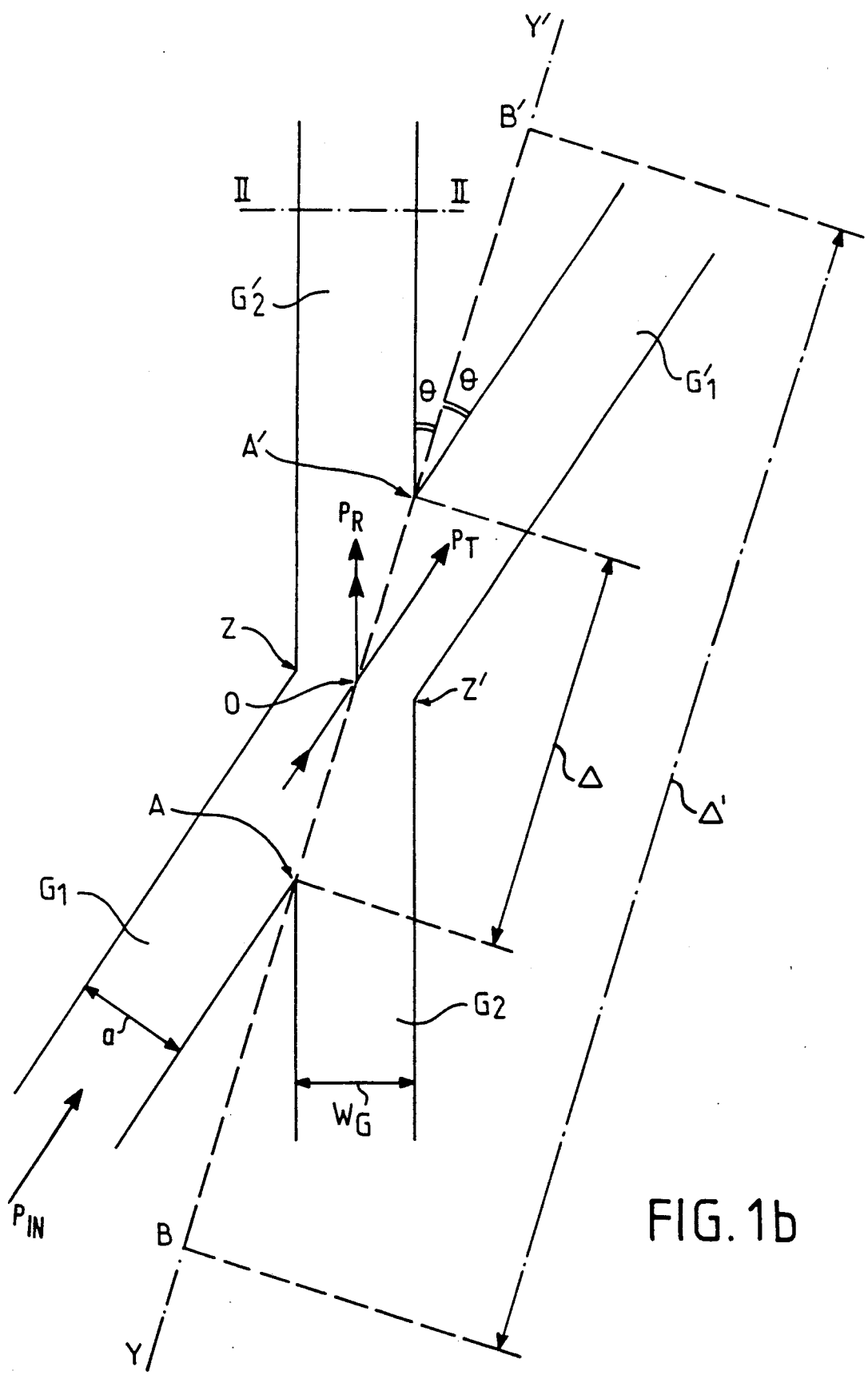

FIGS. 1a and 1b show diagrammatically, viewed from above, an example of a switching element according to the invention. In this example, the element has the form of an X. This element comprises two optical guides $G_1$ and $G_2$ integrated on a substrate S.

The optical guides $G_1$ and $G_2$ each have a transverse dimension a and cross each other at a small angle $2\theta$. The term "small angle" is to be understood to mean an angle whose value is less than 10°. This crossing angle $2\theta$ admits a bi-secting plane whose track is represented by YY' in FIG. 1. The transverse dimension a of each of the guides is chosen to be identical in the following description for the simplicity of the manufacturing method.

The invention especially has for its object to process the monomode luminous signals having a wavelength of 1.3 or 1.55 $\mu$m, which are the actual standards in the field of telecommunication.

As shown, viewed from above, in FIG. 1a, this switching element in the form of an X constituted by two rectilinear guides crossing each other first comprises means for carrying out the switching operation.

The means for carrying out the switching operation consist in forming a reflecting plane BB' disposed in exact coincidence with the bi-secting plane YY' of the crossing angle $2\theta$.

This reflecting plane is obtained by producing in one of the two regions of the crossing zone limited by the bi-secting plane an abrupt variation of the refractive index and more exactly a diminution of the refractive index sufficient to obtain the total internal reflection of the beam originating from the opposite zone and arriving at the interface BB' produced by this index difference at an angle of incidence $(\pi/2 - \theta)$.

This diminution of the index is obtained by the injection of charge carriers into the chosen region by means of a p-n junction 10 $C_2/C_1$ formed in the said region.

When the junction 10 $C_2/C_1$ will be active, a signal entering the guide $G_1$ arranged in the zone opposite to that of the junction will be reflected by the reflecting plane indicated symbolically by BB' and will leave through the prolongation $G_2'$ of the adjacebt guide $G_2$ disorientated by an angle $2\theta$ with respect to the axis of $G_1$.

When the junction 10 will be passive, the signal entering the guide $G_1$ will continue its way beyond the crossing region and will leave through the prolongation $G_1'$ of the said guide $G_1$.

If the dimensions of the guides $G_1$ and $G_2$ are such that the input signal is a monomode signal, the output signal will also be a monomode signal because in the element according to the invention widened regions do not exist, in which modes of higher orders could be activated.

If the guide $G_1$ has been chosen to transport the switchable signal, the guide $G_2$ can transport only a non-switchable signal, that is to say that it can transport only a signal propagating beyond the crossing region in its own prolongation $G_2'$.

It will be seen below that the structure of the optical guides and the value of the different parameters of said structure (thicknesses of the layers, transverse dimensions of the guides etc ...) also play an important part to reach the objects of the invention.

Figure 2A:
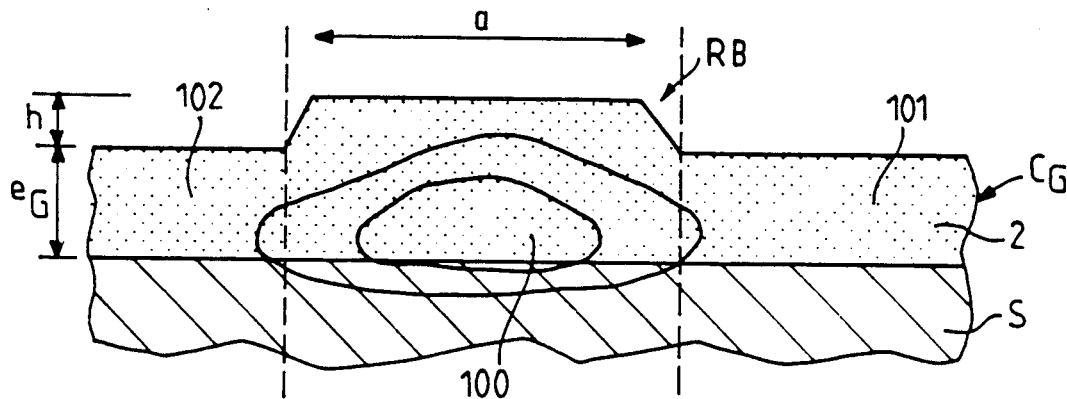
FIGS. 2a to 2c show each a sectional view of FIGS 1a, 1b taken on the axis II—II in embodiments of the structures for confinement of light described in Example I.

As shown in FIG. 2a, which is a sectional view taken on the axis I—I of FIG. 1a, the structure of an optical guide particularly suitable to attain the objects of the invention comprises a substrate S of a confinement material and a guiding layer $C_G$ of a material 2. The materials constituting the substrate S and the guiding layer $C_G$ are favourably chosen to form a heterostructure. Each guide moreover comprises a guiding strip RB having a rectangular or substantially rectangular section erected over a height h above the device formed in the material 2 of the guiding layer and having a transverse dimension a. The edges of the strip are therefore substantially parallel to each other and are also perpendicular to the substrate. The angle with respect to the substrate depends upon the manufacturing method.

Figure 2B:
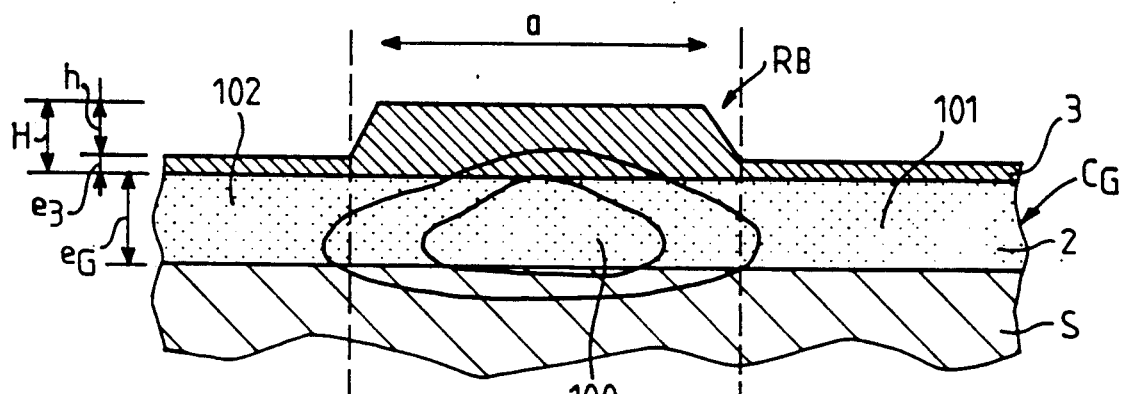

In a preferred embodiment of the invention, as shown in sectional view taken on the axis I—I of FIG. 1a in FIG. 2b, the structure of an optical guide suitable to attain the objects of the invention comprises a substrate S of a confinement material, a guiding layer $C_G$ of the material 2 and an upper confinement layer 3. Preferably, the materials constituting the substrate S, the guiding layer $C_G$ and the confinement layer 3 are chosen to form a double heterostructure. Each guide moreover comprises, as in the case of FIG. 2a, a guiding strip RB, which is formed here from the material of the confinement layer 3.

For the envisaged application, it will be favourable to choose for the substrate a binary III-V material, for example indium phosphide (InP) and for the guiding layer a quaternary III-V material having the composition:

$$Ga_xIn_{1-x}As_yP_{1-y},$$

in which the concentration x and y are connected with each other by the relations:

$$x=0.435y,$$

for each value of y.

The wavelength associated with the forbidden band energy is 1.22 μm if $y \approx 0.5$.

FIGS. 2a and 2b also show the iso-energy lines, which permit of understanding how the light beam is guided in such heterostructures comprising a guiding strip. It has been found that the section of the beam has an elongate form and that the beam propagates in the direction defined by the guiding strip whilst essentially remaining in the guiding layer. As is known to those skilled in the art, this is due to the fact that the InP material constituting the substrate S and, as the case may be, the confinement layer, has a refractive index lower than that of the layer $C_G$ of GaInAsP and that the regions 101 and 102 of the guiding layer $C_G$ situated on either side of the guiding strip RB have a refractive index lower than that of the region 100 situated under the strip RB designated as guided region. The index difference Δ n between the regions 101, 102 ans the guided region 100 is due to the difference in thickness of the layers in these regions and results in that these regions 101 and 102 behave as if they were formed from a confinement material. They are designated as lateral confinement regions.

Rules will be given hereinafter relating to the conditions of determining the values of the height h of the guiding strip RB, of its transverse dimension a, of the thickness $e_3$ of the upper confinement layer, of the thickness $e_G$ of the guiding layer, and of the composition of the guiding layer in order to optimize the device according to the invention both when the junction is active and when the junction is passive.

Figure 3A:
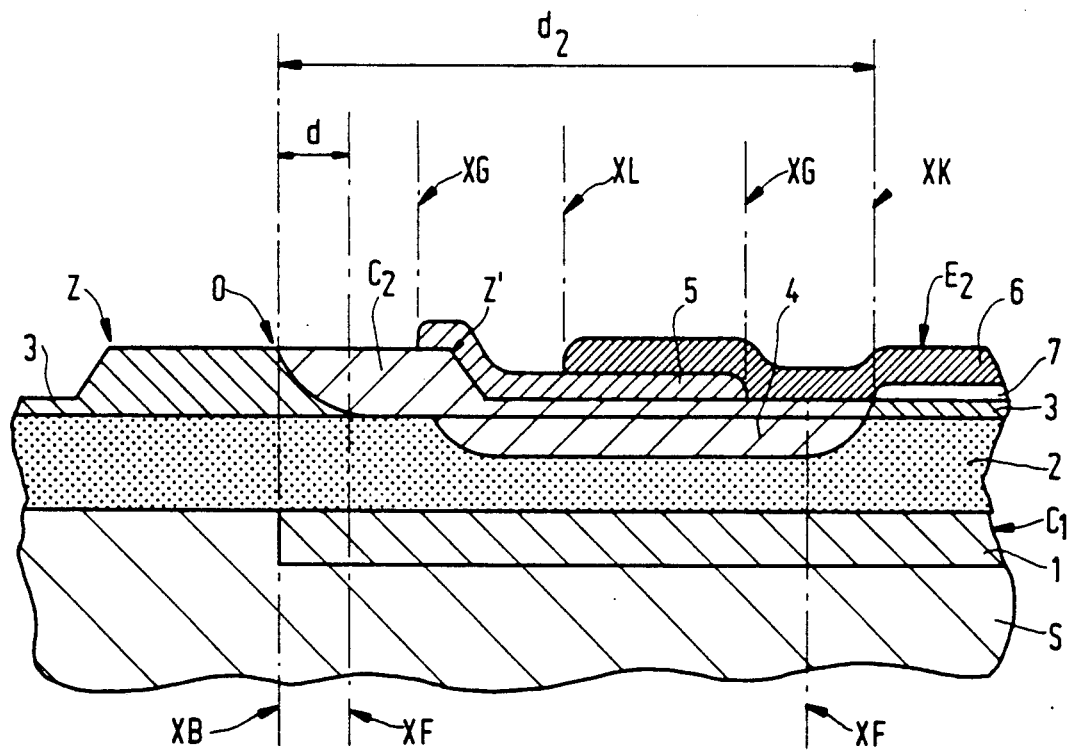
FIG. 3a shows a sectional view taken on the axis I—I of FIG. 1a in the embodiment shown in FIG. 2b and described in Example I.

In fact, a p-n junction is not sufficient to obtain a perfect reflecting plane during the active mode of operation; a current-limiting structure should be added to the said junction. According to the invention, this structure is obtained in a simple and effective manner, as shown in FIG. 3a in a sectional view taken on the axis I—I of FIG. 1a and corresponding to a guide structure having a double heterostructure according to FIG. 2b. This p-n junction comprises on the one hand a layer $C_1$ of a material 1 of the n-conductivity type arranged in the upper part of the substrate S, which is then chosen to be semi-isolating, and on the other hand a layer $C_2$ of a material 4 of the p-conductivity type arranged in the upper part of the guiding layer $C_G$ or adjacent to this layer.

It is particularly favourable that the layer $C_2$ of the p-type is rectangular, as shown in FIG. 1a, viewed from above, and has a transverse dimension $d_2$ and a longitudinal dimension, i.e. parallel to the bi-secting plane YY' and denoted by Δ'.

The layer $C_1$ of the n-type has a longitudinal dimension substantially equal to Δ' and a transverse dimension $d_1 > d_2$.

The layers $C_1$ and $C_2$ are arranged on either side of the guiding layer $C_G$ opposite to each other so as to have each a longitudinal edge BB' in coincidence with each other and in coincidence with the bi-secting plane YY' of the angle 2θ.

Thus, during the application in direct sense of a current density to this p-n junction, by injection of charge carriers a plate of small index will be obtained between the layers $C_1$ and $C_2$ in the guiding layer $C_G$ and this plate will provide a reflecting plane arranged so as to coincide with the said bi-secting plane. Therefore, according to the invention, the total internal reflection is obtained on a very localized plane. Moreover, the position of the reflecting plane in coincidence with the bi-secting plane is optically most favourable.

In order to avoid that the evanescent wave leaks away through the plate, during the reflection it is necessary to provide for the dimension $d_2$ of the layer $C_2$ of the p-type, which limits the transverse dimension of the p-n junction, at least such a value that:

$$d_2 > 3 \mu m.$$

There will be preferably chosen: $d_2$ of the order of 6 μm to 8 μm.

In a method of manufacturing described below, it will appear that it is advantageous to form the layers $C_1$ and $C_2$ by simple localized implantation or diffusion of suitable ions on the one hand at the surface of the substrate of InP for the layer $C_1$ and on the other hand at the surface of the crossing region for the layer $C_2$.

It is clear that the device according to the invention can be obtained in the same manner if the guides are formed at least from a simple heterostructure of the kind shown in FIG. 2a.

Figure 2C:
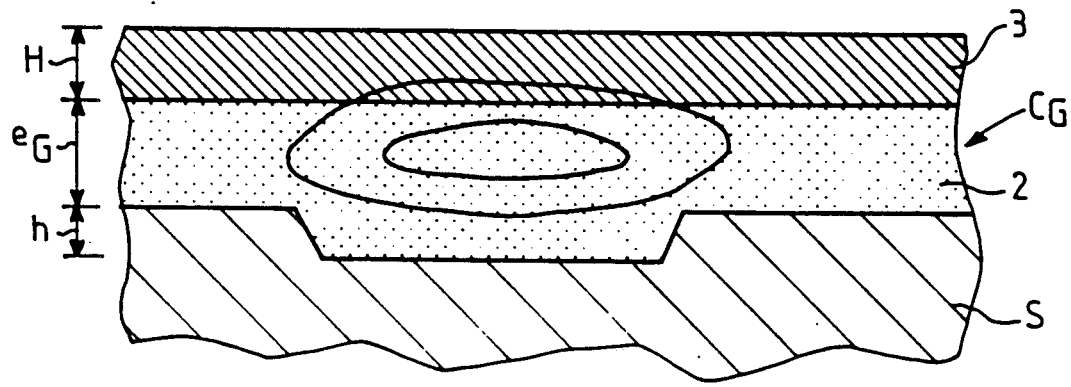

As shown in FIG. 2c in a sectional view taken on the axis II—II of FIG. 1b, the guide structure is a double heterostructure consisting advantageously of the same materials as in FIG. 2b, but the strip RB is obtained by means of a groove formed in the substrate S and filled with the material 2 of the guiding layer. The surface of the device is then planar. The n-type layer $C_1$ is formed, as already stated above, in the upper part of the substrate directly under the guiding material, while the p-type layer $C_2$ is formed in the upper confinement layer 3 whilst ensuring that it reaches the upper surface of the guiding layer 2. The dimensions of the different elements can be the same as those that will be given later for the double heterostructure of FIG. 2b, but the upper confinement layer 3 will in this case favourably have a thickness $\approx 2.5$ μm. However, it should be noted that this kind of embodiment has the advantage of being planar, but yields results slightly less satisfactory than with the so-called external strip type and especially with the so-called external strip with upper confinement layer type.

According to the invention, in order to avoid during the active mode of operation of the p-n junction, i.e. in the switching mode, that the evanescent wave produced according to the prior art at each end AA' of the crossing region (cf. FIG. 1b) leaks away, the longitudinal dimension Δ' of the p-n junction will be chosen to be large with respect to the dimension Δ of this diagonal AA'. Moreover, the ends B and B' of the p-n junction will be arranged symmetrically with respect to the centre 0 of the crossing region along the longitudinal bisecting plane YY'.

The longitudinal dimension $\Delta'$ of the p-n junction will be chosen to be larger as the crossing angle $2\theta$ will be chosen to be smaller.

In general, the crossing angle will be chosen to be:

$$2° < 2\theta < 6°$$

and in these conditions there will be chosen:

$\Delta' \approx 600 \ \mu m$ for $2\theta \approx 2°$ $\Delta' \approx 400 \ \mu m$ for $2\theta \approx 4°$ $\Delta' \approx 300 \ \mu m$ for $2\theta \approx 6°$.

The maximum index difference that can be obtained by injection of charge carriers into the junction being of the order of $\Delta n \approx 8.10^{-2}$, this index difference imposes a minimum for the incidence angle $\pi/2 - \theta$ and hence a maximum for the angle $\theta$, which must preferably not exceed 2°. Thus, the smaller the angle, the higher will be the rate of reflection on the plate formed by the p-n junction.

However, if the interest is seen directly of forming switching elements whose output guides enclose a small angle with each other, $$2\theta \leq 4° \text{ (corresponding to } \theta \leq 2°\text{)}$$

for improving the rates of reflection in the active mode, a difficulty is then met. In fact, when the angle $2\theta$ is less than 4°, in the passive mode, the incident beam, instead of propagating solely in the prolongation of the input guide, is distributed between the two output guides, while the power propagating in the second output guide can reach high proportions of the order of 40%. The losses by diaphony induced by mode conversion are therefore very substantial.

It is clear on the other hand that an angle $2\theta$ which is very small has the disadvantage that it can be formed only with difficulty and that it necessitates a p-n junction having a large dimension $\Delta'$.

With an angle $2\theta \approx 4°$ and a p-n junction having a dimension $\Delta' \approx 400 \ \mu m$, in the switching situation already an extinction of more than 30 dB is obtained in the prolongation of the input guide; this means that not more than 1/1000 of the light is passed through this path.

Moreover, the observations with respect to the device in operation show that the losses due to the evanescent wave at the points A and A' are entirely avoided.

Now it is very important for the formation of a matrix by means of several switching elements that the outputs of the switching element are balanced, that is to say that the powers at the output paths imparted by the beam in the active mode and in the passive mode are equal to each other. This is attained when on the one hand the losses are minimized at the path in the active mode and in the passive mode and on the other hand when the extinction at the unused path reaches at least 30 dB.

The disadvantageous effect of the distribution of the beam in the passive mode can be minimized by acting upon several parameters, more particularly the crossing angle $2\theta$ of the guides. One of the objects of the invention therefore is to provide a switching element which in the transmission mode permits of obtaining a transmission coefficient T as close to 1 as possible in the prolongation of the input guide and such a coefficient as close to 0 as possible in the adjacent guide.

The operating conditions in the transmission mode are considered to be ideal when:

$P_T/P_{IN} \approx 1$, $P_R/P_{IN} \approx 0$ $P_{IN}$ being the power injected into the input guide $G_1$, $P_T$ being the power transmitted to the prolongation $G_1'$ of the same guide beyond the crossing region and $P_R$ being the power reflected in the passive mode in the adjacent guide $G_2'$.

The observations which have led to the device according to the invention show that the results are always slightly more favourable when guides having a double heterostructure are utilized. Therefore, in the embodiment described below, there is chosen to show the influence of the different parameters of such a double heterostructure on the behaviour of an element according to the invention. These different parameters therefore are:

The guide structure having a double heterostructure according to FIG. 2b and its description;
the crossing angle $2\theta$;
the thickness $e_3$ of the upper confinement layer 3;
the transverse dimension a of the strip RB;
the height h over which the strip RB is erected above the layer 3;
the composition of the quaternary layer, i.e. the concentration y of As.

The four last parameters, i.e. $e_3$, $W_G$, h and y permit of calculating the index variation $\Delta n$ appearing due to the difference in thickness between the regions 101, 102 and the region 100 (cf. FIG. 2b).

The curves of FIG. 4 have been obtained in the case of a double heterostructure according to that of this FIG. 2b in order to obtain the conditions in which the passive mode of operation is optimal.

Figure 4A:
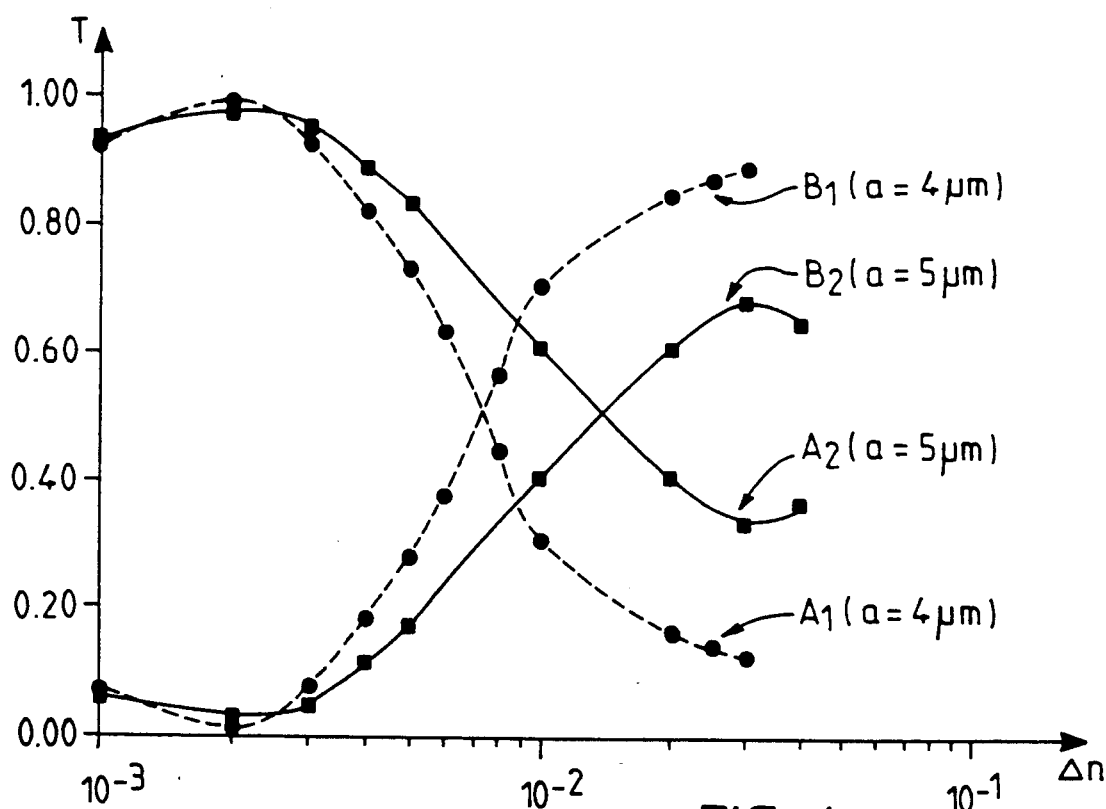
FIG. 4a shows the curves indicating the value of the transmission coefficient in the passive mode in line with the input guide (curves A) and in the adjacent output guide (curves B) when the crossing angle $2\theta = 2°$ for different values of the width of the guides (4 or 5 $\mu$m), all this as a function of the index variation between the guided region and the lateral confinement regions illustrating the operation of the elements of Examples I and II.

The curves of FIG. 4a represent the variations of the output power with respect to the input power at the two output paths in the passive mode when the crossing angle $2\theta \approx 2°$ as a function of $\Delta n$.

The curve $A_1$ represents $P_T/P_{IN}$ in $G_1'$ for $a = 4 \ \mu m$.
The curve $A_2$ represents $P_T/P_{IN}$ in $G_1'$ for $a = 5 \ \mu m$.
The curve $B_1$ represents $P_R/P_{IN}$ in $G_2'$ for $a = 4 \ \mu m$.
The curve $B_2$ represents $P_R/P_{IN}$ in $G_2'$ for $a = 5 \ \mu m$.

Figure 4B:
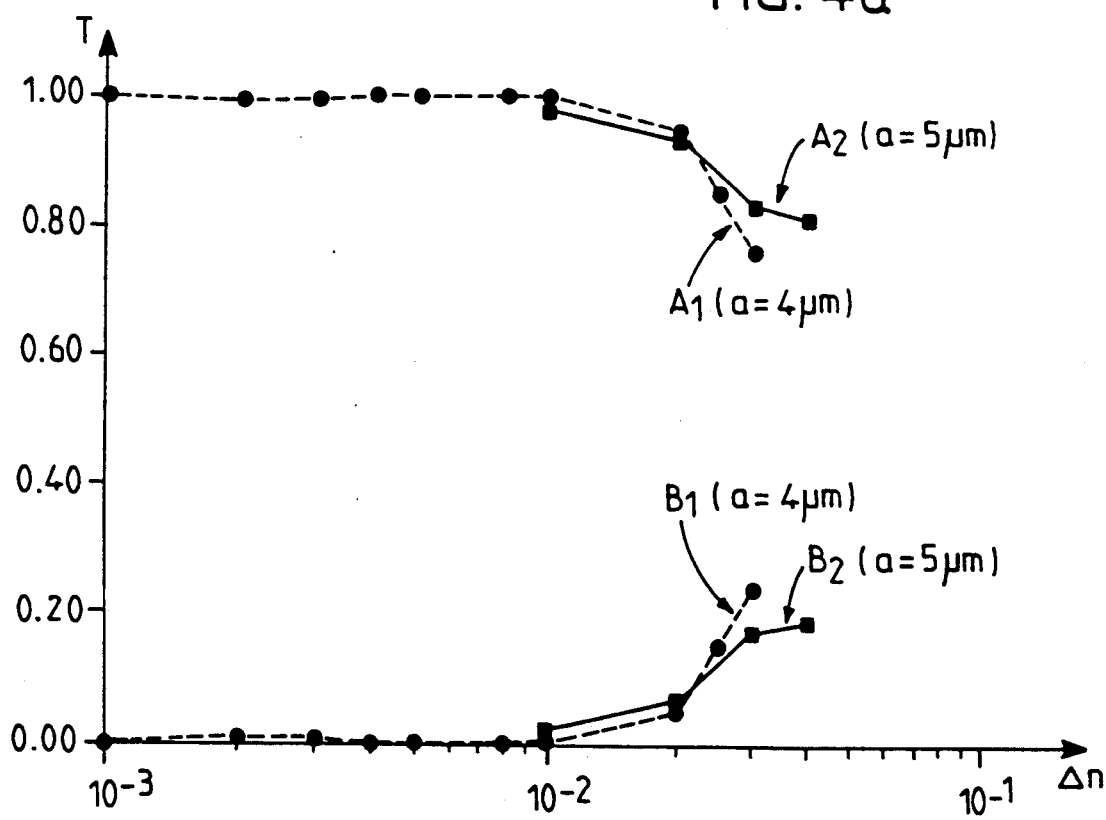
FIG. 4b shows the variations of the same characteristics when $2\theta = 4°$ for Examples I and II.

The curves of FIG. 4b represent the same variables when the crossing angle $2\theta = 4°$.

From FIG. 4a it is found that for an angle $2\theta \approx 2°$ the optimum operating conditions in the passive mode are only obtained in a very narrow range, in which $\Delta n \approx 2.10^3$ and that the results are slightly more favourable, i.e. the losses are lower ($P_T/P_{IN}$ closer to 1 and $P_R/P_{IN}$ closer to 0) for the guides having a dimension $a \approx 4 \ \mu m$ (curves $A_1$ and $B_1$).

On the contrary, when $a \approx 5 \ \mu m$ (curve $A_2$ and curve $B_2$ of FIG. 4a), $P_T/P_{IN} = 1$ or $P_R/P_{IN} = 0$ is never obtained, but the lateral confinement is a little less critical.

From FIG. 4b it is found that, as soon as the angle $2\theta \approx 4°$, the optimum operating conditions in the passive mode ($P_T/P_{IN} \approx 1$ and $P_R/P_{IN} \approx 0$) can be obtained in a wider range corresponding to:

$$10^{-3} \leq \Delta n \leq 10^{-2}$$

and that the conditions with respect to the dimension a are less draconic. In fact, the optimum operation in the passive mode is obtained with $2\theta \approx 4°$ for $$3 \ \mu m \leq a \leq 6 \ \mu m.$$

Figure 4C:
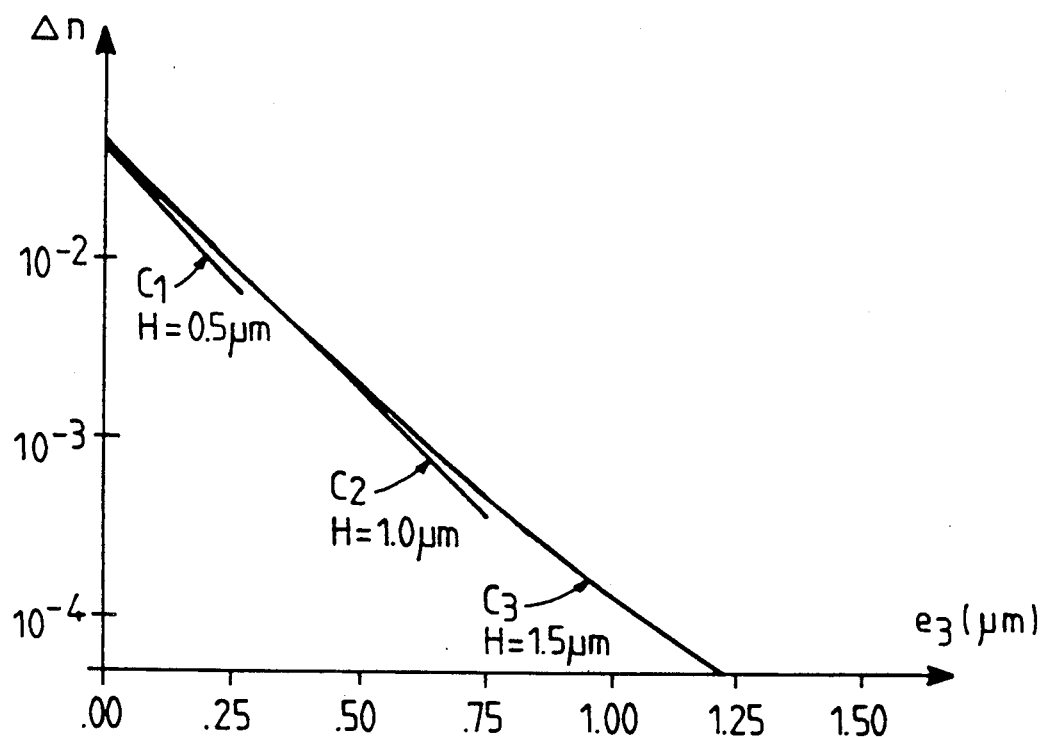
FIG. 4c shows the variation of the index difference $\Delta n$ as a function of the thickness $e_3$ of the upper confinement layer and as a function of the overall thickness H of confinement material above the guided region according to Examples I and II.

The curves of FIG. 4c show the influence of the thickness $e_3$ of the confinement layer 3 on the value of the index difference $\Delta n$ between the regions 101, 102 and 100 for different values of the height $$H = h + e_3$$

Figure 4D:
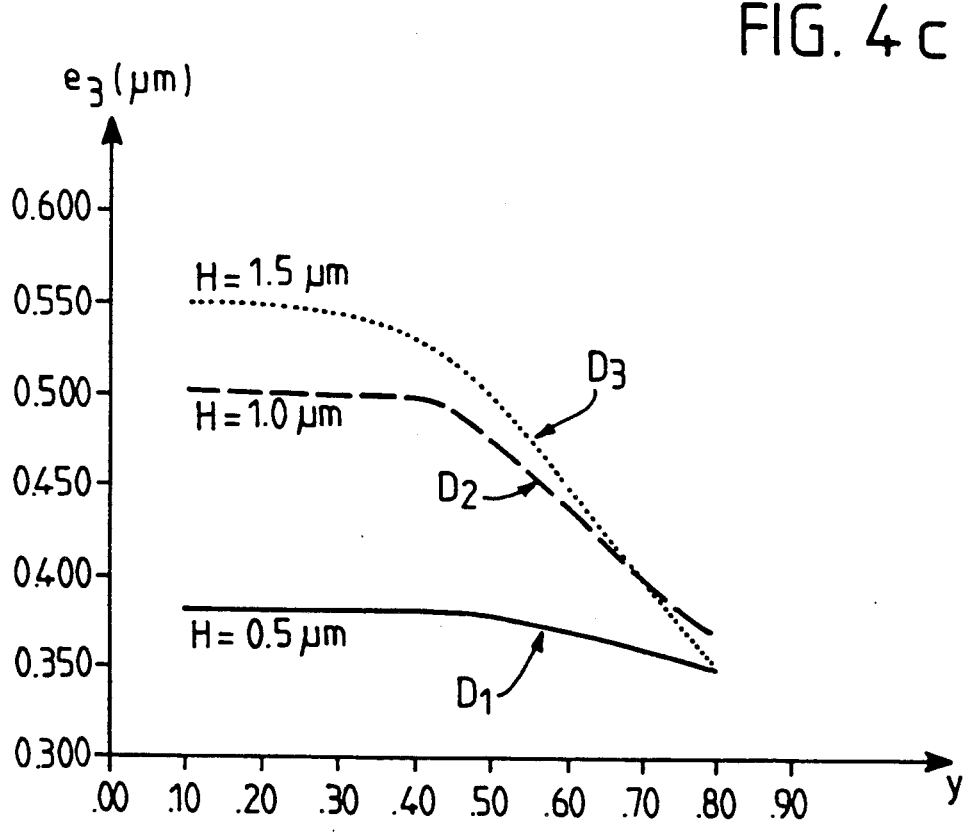
FIG. 4d shows the variations of the thickness of the binary confinement layer $e_3$ with the concentration y of the quaternary guiding layer to obtain an index difference between the lateral confinement layers and the guided region $\Delta n \approx 2.10^{-3}$ and for different values of the overall thickness H of the confinement material above the guided region for Examples I and II.

It has been found according to the curves of FIG. 4c, in which
$C_1$ corresponds to $H = 0.5 \ \mu m$
$C_2$ corresponds to $H = 1.0 \ \mu m$
$C_3$ corresponds to $H = 1.5 \ \mu m$,
that the optimum value $$10^{-3} \leq \Delta n \leq 10^{-2}$$

is obtained more favourably with $$H \approx 1.0 \ \mu m \text{ and}$$

$$0.25 \ \mu m \leq e_3 \leq 0.65 \ \mu m,$$

resulting in a height of the strip RB $$0.35 \ \mu m \leq h \leq 0.75 \ \mu m,$$

these results being obtained by fixing the other parameters of the device, such as the concentration y of arsenic of the quaternary layer and the operating wavelength $\lambda$ at the values:
$y \approx 0.5$
$\lambda \approx 1.55 \ \mu m.$ This concentration of the composition of the quaternary layer also plays a part in the optimization of the device in the passive mode. FIG. 4d shows the influence of the concentration y (x being chosen so that $x = 0.435$ y for the stoichiometry) on the dimension $e_3$ which must be chosen to obtain:
$\Delta n \approx 2.10^{-3}$ at the operating wavelength $\lambda \approx 1.55 \ \mu m$;
The curve $D_3$ has been drawn for $H = 1.5 \ \mu m$;
The curve $D_2$ has been drawn for $H = 1.0 \ \mu m$;
The curve $D_1$ has been drawn for $H = 0.5 \ \mu m$.

These layers are given to show a person skilled in the art how to influence the different parameters y, $e_3$, H, h to obtain the best possible results in the passive mode, whilst having available a certain latitude with respect to the technology which permits of obtaining a, H and y and hence with respect to the manner of utilizing the device according to the invention.

It has therefore been found that in general it is important to choose an angle $2\theta \approx 4°$ which yields the best results both in the active and in the passive mode and leaves a certain possible margin of errors with respect to the dispersion of the other parameters during the use of this device.

On the other hand for the propagation of the luminous monomode signals in the quaternary layer, the calculations show that the optimum thickness of the latter, whilst taking into account the values of the other parameters chosen beforehand is:

$$e_G \approx 0.4 \ \mu m.$$

The experimental use of devices obtained according to the calculations has shown results perfectly in conformity with the results attained in a simulated situation.

The device according to the invention further has the advantage that it is formed on a semi-isolating substrate adapted to receive also active elements, such as field effect transistors, diodes, etc ... Moreover, the electrical contacts can be formed on a single surface of the substrate.

Figure 3C:
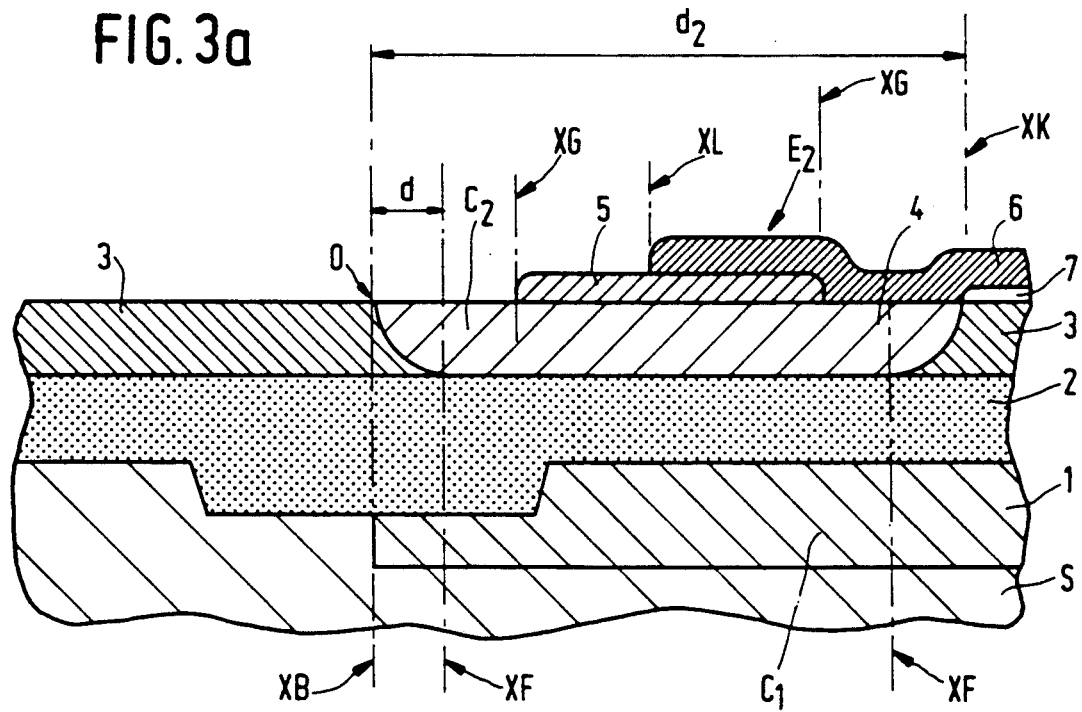
FIG. 3c shows a sectional view taken on the axis I—I of FIG. 1a in an embodiment of FIG. 2c described in Example I.
Figure 3B:
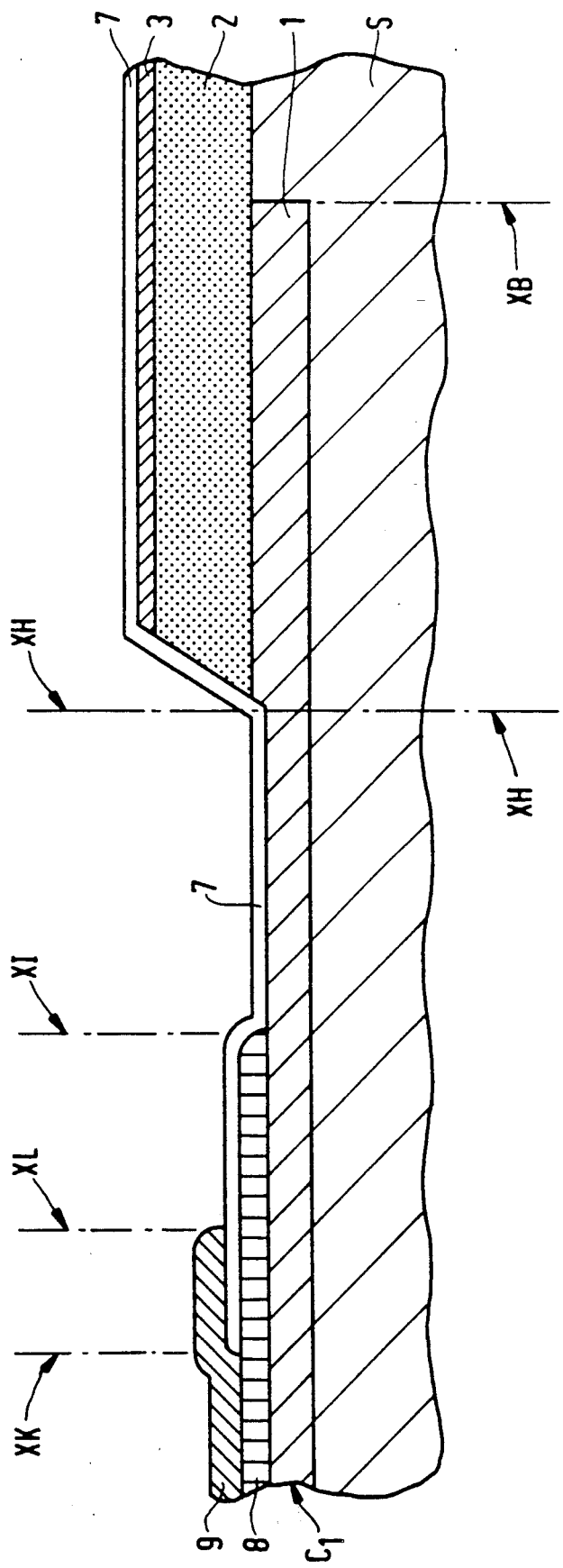
FIG. 3b shows a sectional view taken on the axis III—III of FIG. 5a in the embodiment shown in FIGS 2b or 2e and described in Examples I and II.
Figure 5A:
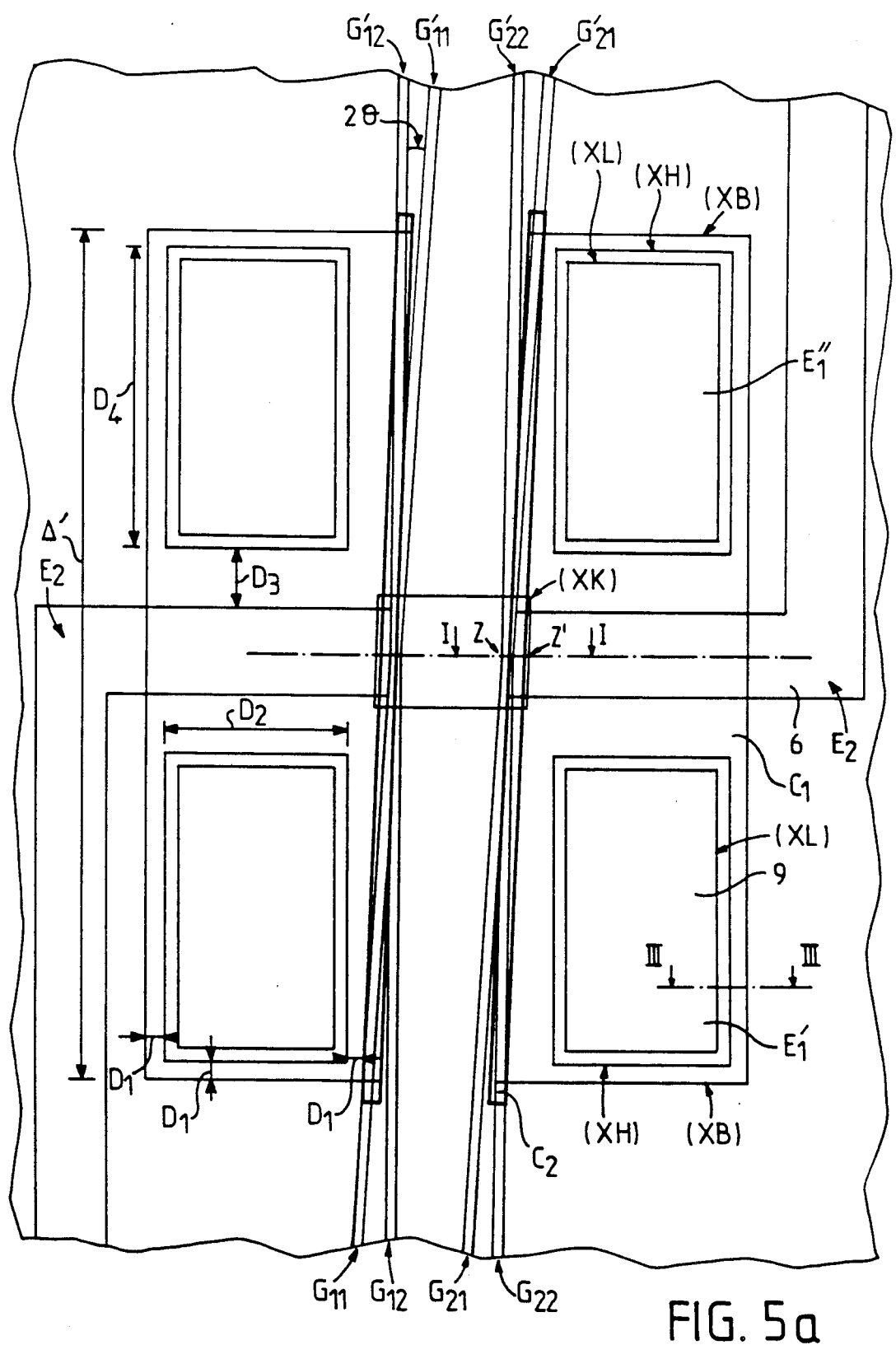
FIG. 5a shows an embodiment of a group of two elements with their electrodes, viewed from above, described in Example I.

As shown in sectional view taken on the axis I—I of FIG. 1a in FIG. 3a, the switching element furthermore comprises a contact $E_2$ of the p-type for the injection of charge carriers into the layer $C_2$ and as shown in sectional view taken on the axis III—III of FIG. 5a in FIG. 3b, a contact $E_1$ of the n-type for the extraction of the charge carriers from the layer $C_1$.

As is shown, viewed from above, in FIG. 5a, the contact $E_2$ will preferably be provided in the form of a pad or of a line arranged along the transverse axis of symmetry $ZZ'$ of the crossing region so as to inject the maximum number of charge carriers at the centre of the layer $C_2$ into the crossing region.

As shown in the same FIG. 5a, the contact $E_1$ will preferably be provided in the form of two pads $E_1'$ and $E_1''$ having a large surface area, one of whose edges is located as closely as possible to the layer $C_2$, for example at a distance $D_1 \approx 10 \ \mu m$. The pads $E_1'$ and $E_1''$ are provided symmetrically with respect to the transverse axis $ZZ'$ of the crossing region to permit the extraction of the charge carriers symmetrically with respect to their injection.

FIG. 3a shows in sectional view that the electrical contact $E_2$ of the p-type can be constituted by a layer 5 of TiPtAu alloy forming with the layer $C_2$ an ohmic contact, on which a thickening layer 6 of the same alloy is disposed to establish connections, this thickening layer 6 then being partly formed on an isolating layer 7 to permit of forming, for example, the supply lines of the current.

FIG. 3b shows is sectional view that the contacta $E_1'$ and $E_1''$ can be constituted by a layer 8 of the alloy AuGeNi forming with the layer $C_1$ an ohmic contact, on which a thickening layer 9 is disposed of the alloy TiPtAu to connect, for example, these pads to earth. The layers 8 and 9 constituting the contacts $E_1'$ and $E_1''$ can be formed in openings provided in the upper layers of the device covering the upper surface of the layer $E_1$. An isolating layer 7 is also provided to isolate these contacts from the other parts of the device.

FIG. 5a also shows, viewed from above, an example of the disposition of the different elements with respect to each other to form two switching elements. Thus, two first guides are obtained, whose inputs are $G_{11}$ and $G_{12}$ and whose outputs are $G_{11}'$ and $G_{12}'$ which are linear and cross each other at an angle $2\theta$. Subsequently, two other guides are obtained, whose inputs are $G_{21}$, $G_{22}$ and whose outputs are $G_{21}'$, $G_{22}'$ of the same configuration. Two elements thus grouped and formed in the case in which the crossing angle $2\theta \approx 4°$ occupy a surface of 400 $\mu m \times$ 400 $\mu m$ whilst taking into account the position occupied by the electrical supply lines.

Figure 5B:
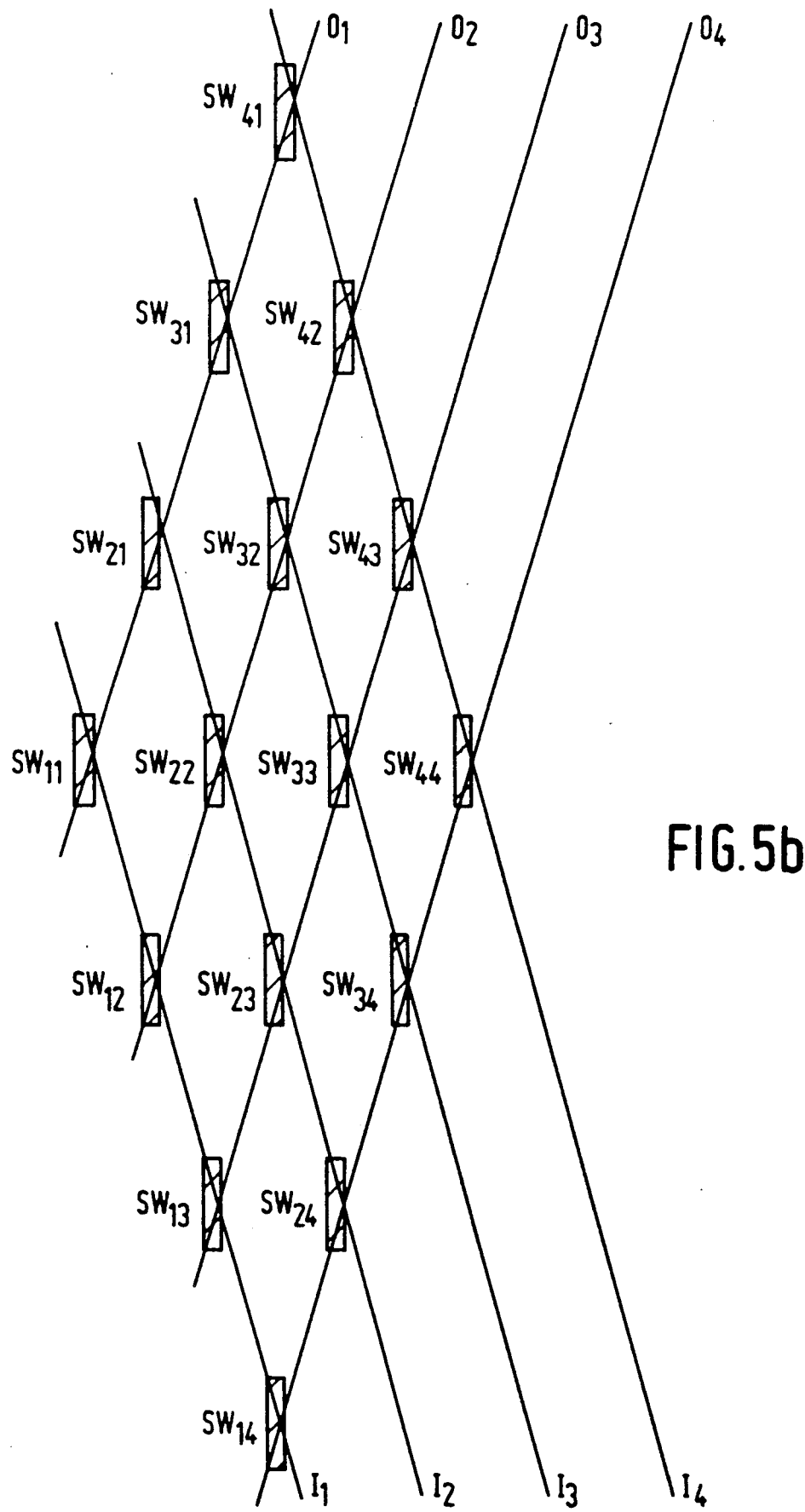
FIG. 5b shows a switching matrix of N guides in N guides composed of elements according to FIG. 1a described in Example I.

The switching element according to the invention is specifically provided, as already stated above, to permit of forming switching matrices of N guides in N guides and not to permit multiplexing of signals. A switching matrix of 4 guides $I_1$, $I_2$, $I_3$, $I_4$ in 4 guides $O_1$, $O_2$, $O_3$, $O_4$ constituted by switching elements according to the invention is shown, viewed from above, very diagrammatically in FIG. 5b. It comprises 16 elements $SW_{ij}$. It occupies a surface area pf 2.8 mm × 1.8 mm on a substrate of about 3 × 1 mm².

Example II

Figure 1C:
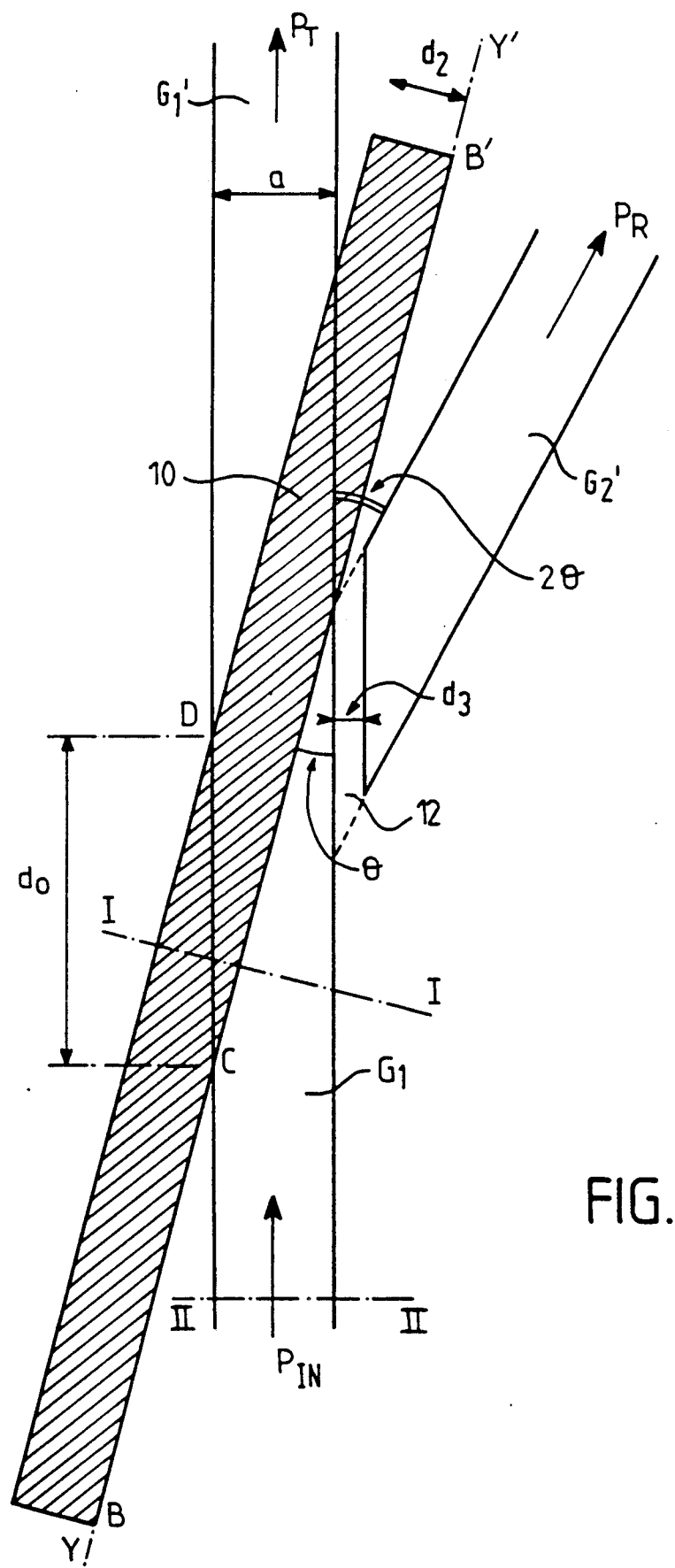
FIG. 1c shows a switching element in the form of a Y, described in Example II, viewed from above.
Figure 1D:
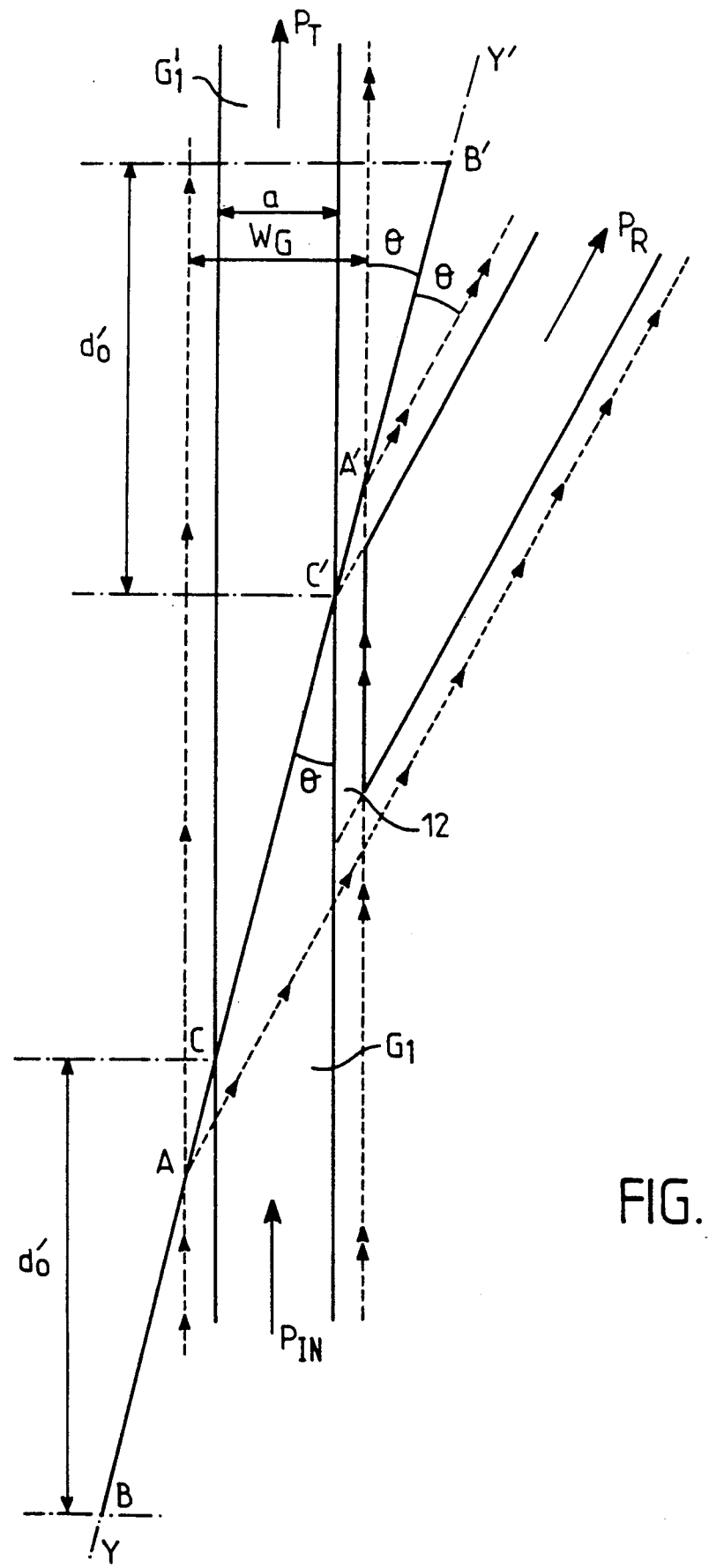
FIG. 1d shows the path of part of the beams in an element of the kind shown in FIG. 1c.
Figure 1E:
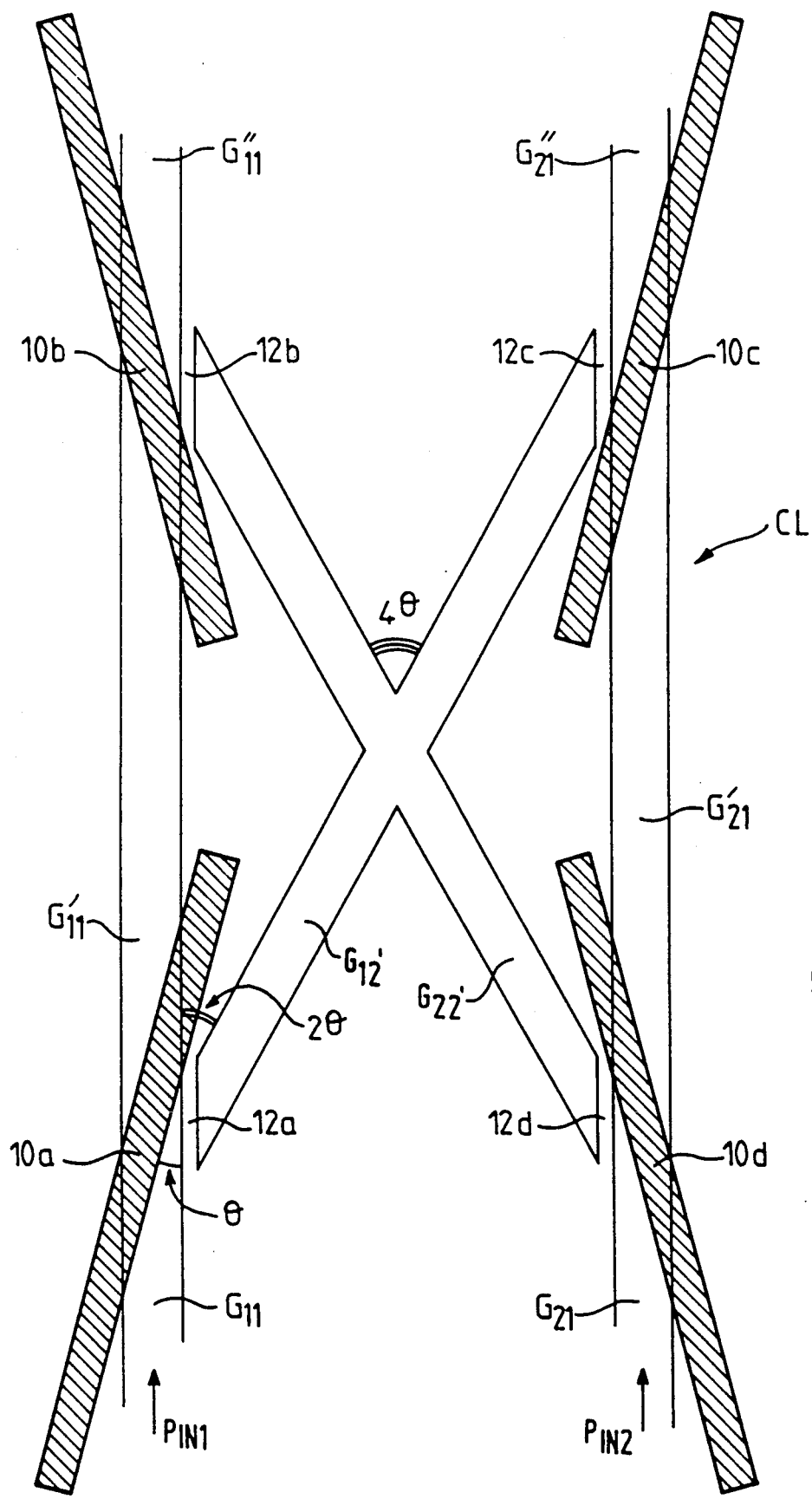
FIG. 1e shows a unitary switching cell L of two guides in two guides formed by four elements in the form of a Y, viewed from above, described in Example II.

In this embodiment, a switching element in the form of a Y is described, which is illustrated in the assembly of FIGS. 1c, 1d, 1e; 2d, 2e; 3b, 3d; 4a to 4f; 5c and, as the case may be, 5a.

As shown in FIG. 1c, viewed from above, diagrammatically, the switching element in the form of a Y first comprises a rectilinear input guide $G_1$, a first output guide $G_1'$ arranged in the prolongation of the input guide and a second output guide $G_2'$ enclosing with the first guide $G_1'$ a small angle $2\theta$.

For the necessity of an operation in total reflection mode, the value of the angle $2\theta$ must be less than 6°. This angle $2\theta$ of joining admits a bi-secting plane, whose track is indicated by YY' in FIG. 1. The transverse dimension of all guides is chosen to be identical in the following description for the sake of simplicity of the method of manufacturing.

The object of the switching element in the form of a Y is to accomplish performances identical to those of the element in the form of an X of Example I whilst having the property of permitting the formation of another type of matrix, in this case completely symmetrical, described hereinafter.

This switching element in the form of a Y first comprises means for carrying out the switching operation, which are entirely similar to the means comprising the X-shaped element of Example I.

These means consist in forming a reflecting plane, whose track is indicated by BB' in FIGS. 1c and 1d and which is arranged in coincidence with the bi-secting plane YY' of the joining angle $2\theta$. This reflecting plane is obtained in the same manner as in Example I.

When the junction 10 will be active, a signal entering the guide $G_1$ arranged in the zone opposite to that of the junction will be reflected by the reflecting plane indicated symbolically by BB' and will leave through the guide $G_2$ disorientated by an angle $2\theta$ with respect to the axis of $G_1$.

When the junction 10 will be active, the signal entering through the guide $G_1$ will continue its way beyond the joining region and will leave through the prolongation $G_1'$ of the input guide $G_1$.

Figure 2D:
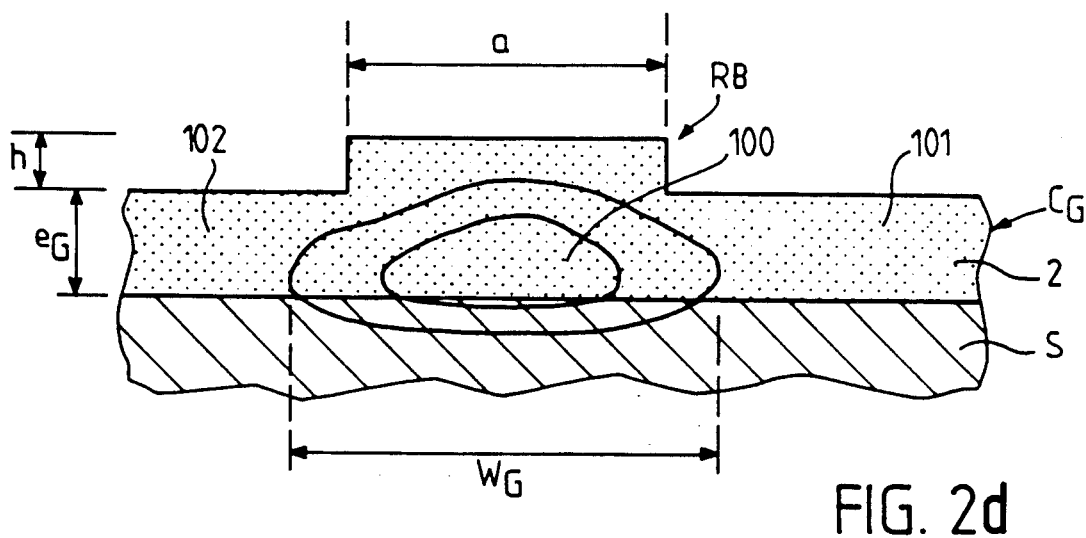
FIGS. 2d and 2e show each a sectional view taken on the axis II—II of FIG. 1c in embodiments described in Example II.

As shown in FIG. 2d, which is a sectional view taken on the axis II—II of FIG. 1c, the structure of an optical guide suitable to attain the objects of the invention is exactly the same as described in Example I corresponding to FIG. 2a. However, each guide comprises a guiding strip RB, which in this case has a rectangular section and has a transverse dimension a. The edges of the strip are therefore parallel to each other and perpendicular to the substrate. It will be seen below that in a preferred embodiment of this example II, the section of the guiding strip must be obligatorily and necessarily rectangular.

Figure 2E:
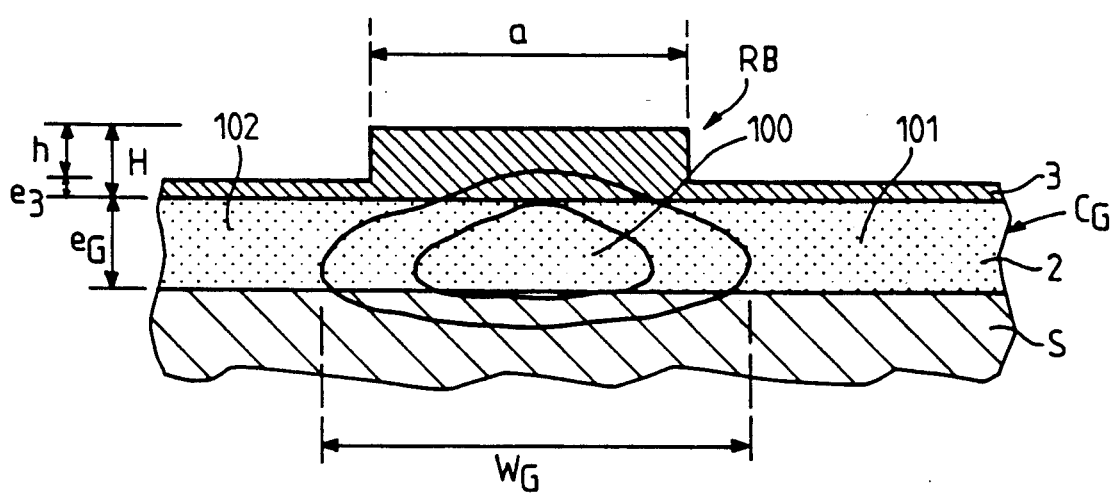

In a preferred embodiment of the invention, as shown in a sectional view taken on the axis II—II of FIG. 1c in FIG. 2e, the structure of an optical guide suitable to attain the objects of the invention is exactly the same as described in Example I corresponding to FIG. 2b, which is the case of the double heterostructure.

For the envisaged application it will be favourable to choose the same materials as described in Example I.

Figure 3D:
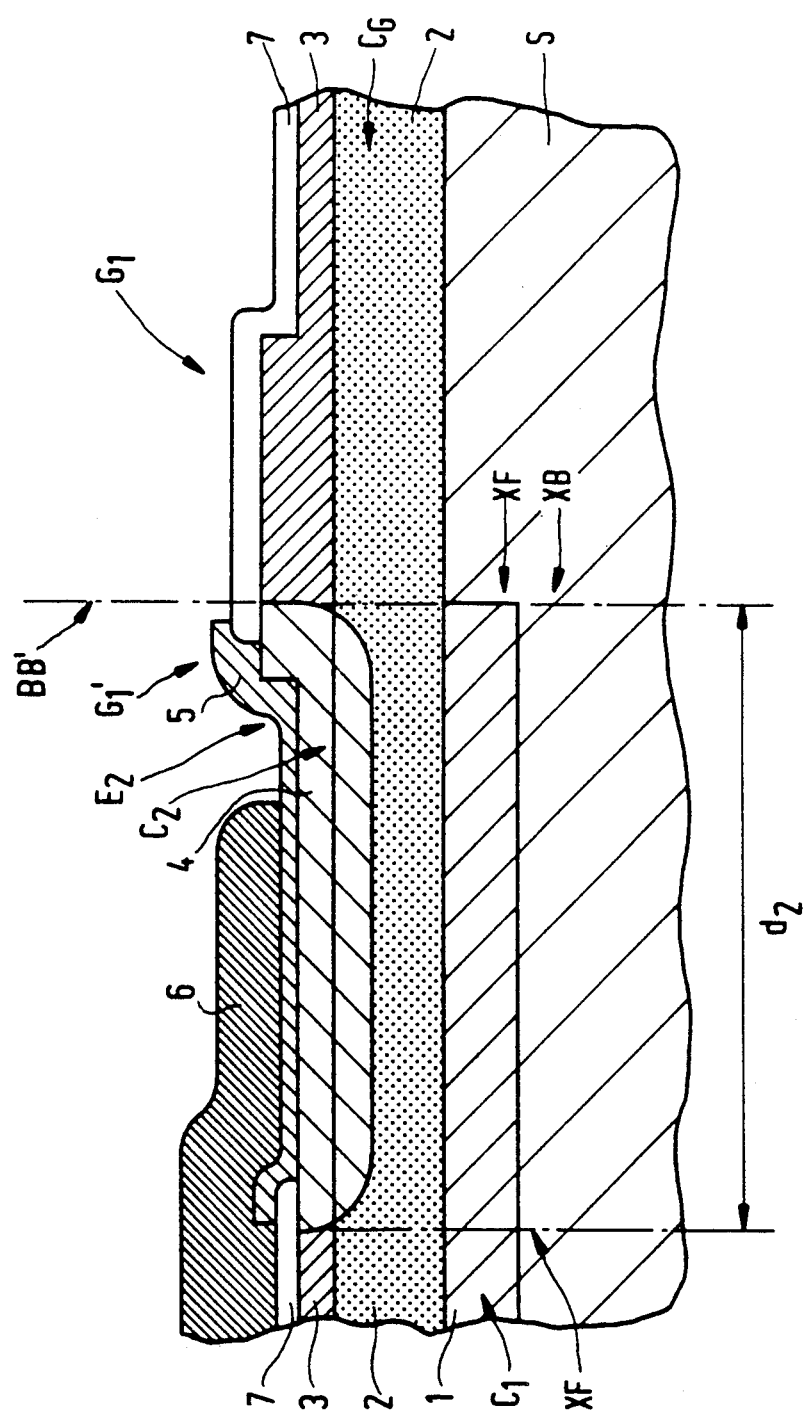
FIG. 3d shows a sectional view taken on the axis I—I of FIG. 1c in the embodiment illustrated in FIG. 2e and described in Example II.

As has been seen above, a p-n junction is not sufficient to obtain a perfect reflecting plane during the active mode of operation; a current-limiting structure has to be added to the said junction. In this embodiment, this structure is obtained in a simple and effective manner, as shown in FIG. 3d in a sectional view taken on the axis I—I of FIG. 1c and corresponding to a guide structure having a double heterostructure according to FIG. 2e. This p-n junction comprises on the one hand a layer $C_1$ of a material 1 of the n-conductivity type arranged in the upper part of the substrate S, which is then chosen to be semiisolating, and on the other hand a layer $C_2$ of a material 4 of the p-conductivity type arranged in the upper part of the guiding layer $C_G$ or adjacent to this layer.

The form and the general disposition of the layers with respect to each other, the operation principle of the p-n junction and the method of manufacturing are the same as in Example I. It is likewise possible to obtain the element in the form of a Y by means of the simple heterostructure of FIG. 2d.

The isoenergy curves represented in the sectional views of FIG. 2d and FIG. 2e show that the wave transported under the strips RB having a transverse dimension a project laterally on either side of the RB by about 1 to 2 μm and that the wave occupies a space having a lateral dimension $W_G >$ a, where $W_G - a \approx 2$ to 4 μm. With reference to FIG. 1d, it has been found that according to the invention a reflecting plane has been provided, whose track is indicated by RB', which projects sufficiently on either side of AA', AA' being the track of the reflecting plane absolutely indispensable to reflect the wave having a transverse dimension $W_G$. FIG. 1d shows especially the track of the extreme light beams separated by the distance $W_G$.

With a joining angle $2\theta \approx 4°$, it is necessary to provide a reflecting plane having a track BB' in FIG. 1b such that the projecting regions C'B' and CB on either side of the input guide $G_1$ have a dimension $d_0' \approx 40$ to 60 μm to ensure in the active mode the reflection of the assmebly of the mode guided in the space having a transverse dimension $W_G$, in the guide $G_2'$ ($d_0'$ being the projection of the projecting regions C'B' and CB in the direction of propagation $G_1G_1'$).

In order to obtain the total internal reflection in favourable conditions, the choice of the joining angles is based on the same criteria as in Example I, the reasoning being illustrated in FIGS. 4a, 4b, 4c and 4d. It has been seen that the value of 4° is a "hinge" value for the behaviour of beams which meet a joining branch in the form of a Y in the passive state. For angles of the order of 2°, the incident beam is distributed among the two branches of the Y, while for angles of the order of 8° the incident beam continues its way in the prolongation of the input guide practically without "seeing" the adjacent guide. The losses in the adjacent guide are lower as the angle is larger. For example, when using an angle of 8° between two guides crossing each other, the adjacent guide will show an extinction of 40 dB with respect to the straight guide, that is to say that only 1/10000 of the light is lost during the crossing.

The choice of a joining angle as small as 4° then imposes a condition on the transverse dimension of the junction. In order that the extinction is made as strong as possible in the prolongation of the input guide when the junction is active, calculations show that the thickness $d_0$ of the p-n junction along the optical axis of the input guide must be at least 40 μm; if this is not the case, the evanescent wave will traverse the plate of low index formed in the active mode.

When taking into account a crossing angle $2\theta$ of 4°, i.e. an angle $\theta \approx 2°$, and a dimension $d_0$ of 60 μm of the junction along the axis, the dimension $d_2$ of the junction must be of the order of 3 μm to 8 μm, as in Example I.

The switching element in the form of a Y also comprises means ensuring that the operating conditions in the transmission mode, i.e. when the junction is passive, are ideal.

It has been seen in Example I that these conditions are ideal when:

$T \approx 1$ (attenuation 0 dB), $R \approx 0$ (attenuation at least 30 dB).

In order to achieve these conditions, the following parameters will be chosen to be identical to those of Example I:

the guide structure comprising a double heterostructure according to FIG. 2e and its description;

the crossing angle $2\theta$;

the thickness $e_3$ of the upper confinement layer 3;

the transverse dimension a of the strip RB;

the height h over which the strip RB is erected above the layer 3;

the composition of the quaternary layer, i.e. the concentration y of As; and the index variation n appearing due to the difference in thickness $H-e_3$ between the regions 101, 102 and the region 100.

However, if in the present embodiment switching elements should be obtained, in which $2\theta \approx 4°$, whilst further promoting more strongly the optimization to obtain the performance $P_T/P_{IN} \approx 1$ $P_R/P_{IN} \approx 0$ (with the strongest possible attenuation), the problem of confinement in the joining region in the passive mode arises.

In this embodiment, this problem is preferably solved by means of a groove 12 having parallel edges provided through the second output guide $G_2'$ having an edge coinciding with the edge of the strip RB of the input guide $G_1$ having a depth h equal to the height over which this strip RB is erected above the device and having a transverse dimension $d_3$ sufficient for the confinement in the passive mode, but not too large to impede the propagation of the beam reflected in the active mode. This transverse dimension $d_3$ will be of the order of 2 μm to 5 μm and preferably 4 μm. The groove 12 therefore has a rectangular section and the section of the guiding strip associated therewith is obligatorily rectangular in this case. Such a formation of grooves with an extremely high precision in the positioning, the transverse dimension, and with absolutely vertical edges is now known to those skilled in the art, as shown more particularly in French Patent Application registered under number 88 08 504 filed on 24 June 1988.

The small transverse dimension that can be obtained by the manufacturing method known from the same Patent Application is also particularly suitable to attain the object of the invention, which consists in not disturbing the beam transmitted in the active mode.

Thus, the switching element of this Example II, provided with the groove 12, is particularly optimized to permit of utilizing small joining angles permitting of obtaining a small angle $\theta$ favourable for obtaining the total internal reflection.

Figure 4E:
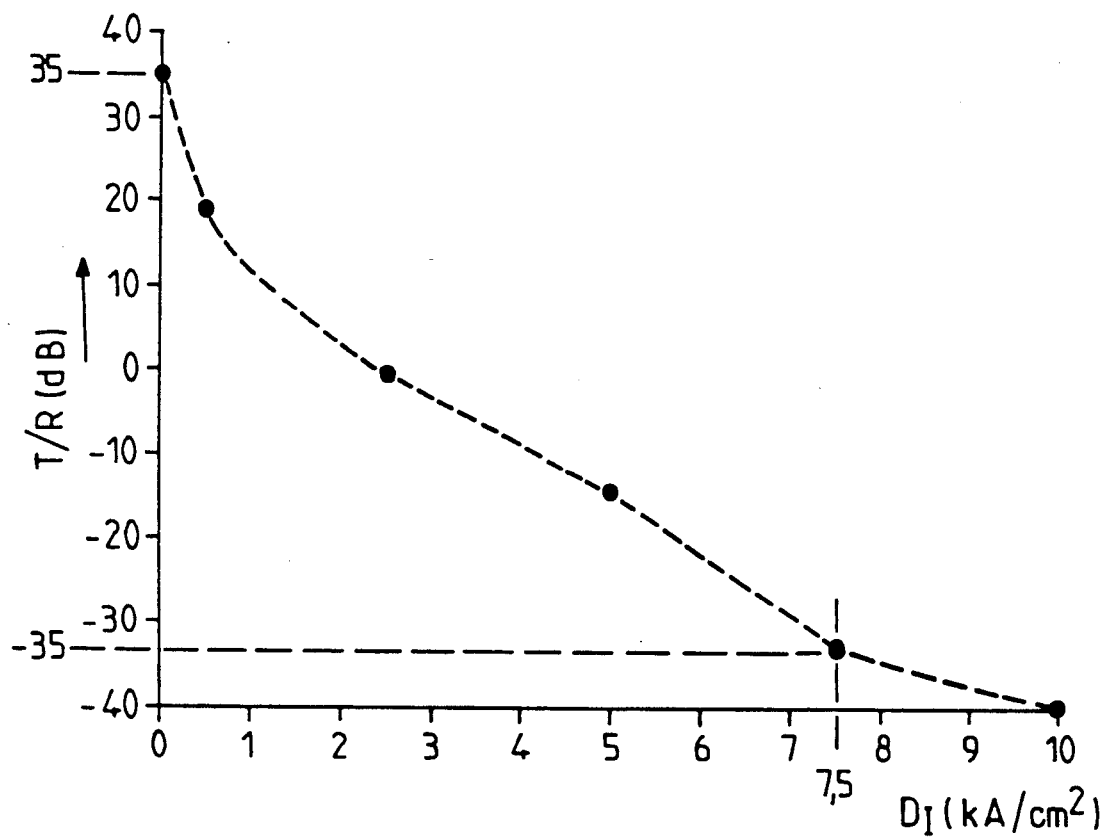
FIG. 4e shows the ratio T/R as a function of the current density $D_f$ applied to the junction, where T is the transmission coefficient in the first output path and R is the reflection coefficient in the second output path in an element described in Example II.

FIG. 4e shows the transmission coefficient T in the first output path with respect to the reflection coefficient R in the second output path as a function of the current density $D_I$ injected into the junction. It has been found that with a switching element obtained in the present example in the conditions in which $a \approx 5$ μm $d_3 \approx 4$ μm $2\theta \approx 4°$, the ratio $T/R = +35$ dB is obtained in the passive mode when $D_I = 0$ and the ratio $T/R = -35$ dB is obtained in the active mode when $D_I = 7.5$ kA/cm$^2$. In fact, the device of this example is very satisfactory in the passive mode and is very satisfactory in the active mode as soon as $D_I$ reaches 7 kA/cm$^2$.

Figure 4F:
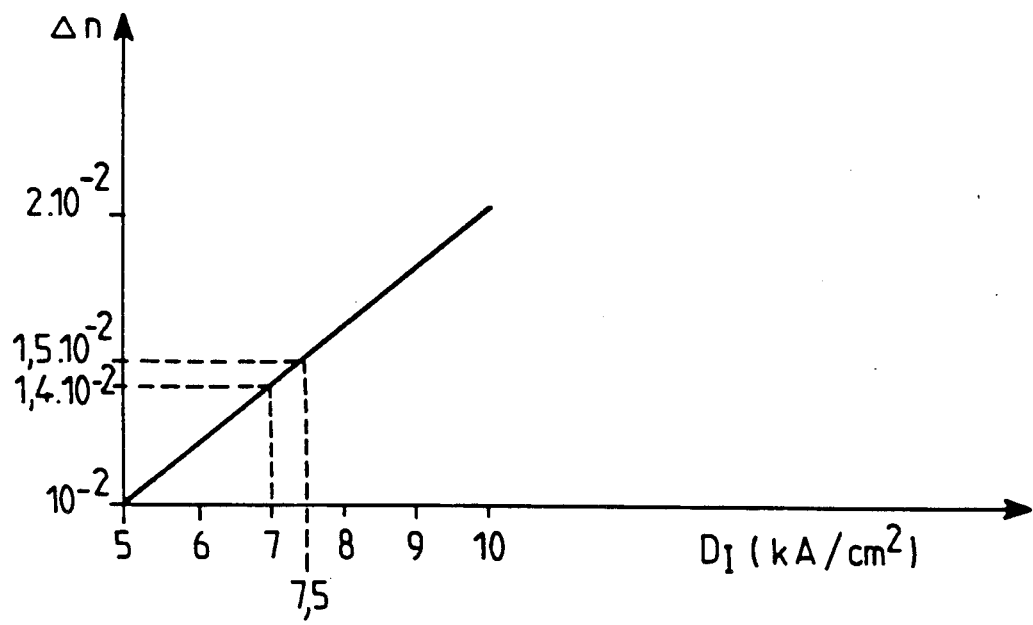
FIG. 4f shows the variations of the index difference $\Delta n$ produced in the junction by the current density $D_f$ in an element described in Example II.

The curve of FIG. 4f gives the index difference n obtained upon passage through the reflecting plane formed by the junction in the active mode as a function of the current density applied to the junction. For $D_I \approx 7$ kA/cm$^2$, the index difference produced is $\Delta n \approx 1.4 \cdot 10^{-2}$.

However, the confinement of light in the guides, even outside the switching region, is not left to chance because a whole matrix cannot be obtained if losses occur in the guide portions joining one element to another element, these losses being added to each other and increasing to a greater extent as the matrix contains a larger number of elements.

Therefore, the guide structure is chosen like that in Example I to minimize the losses in these guide portions according to the consideration of the curves represented in FIGS. 4a, 4b, 4c and 4d.

Therefore, according to the invention, the problem due to the adoption of a joining angle of the order of 4° is solved both in the active and in the passive mode by the adoption of a groove 12 formed as recommended cooperating with the choice of an optimum value of the current density applied to the junction, whilst taking into account the curve of FIGS. 4e and 4b, the other parameters being those of Example I.

In this example, like in Example I, the element can be formed on a semi-isolating substrate. Moreover, the electrical contacts can be formed on a single surface of the substrate, just like is shown, viewed from above, in FIG. 5a, except that the branches $G_{12}$ and $G_{22}$ are omitted, and in sectional view taken on the axis III—III of this FIG. 5a in FIG. 3b, whose description is given in Example I.

The compounds and materials for forming the different regions of the element in the form of a Y are also the same as described for the element x of Example I.

The switching element in the form of a Y of this example is essentially intended to be grouped with 3 other elements of the same kind and structure to constitute a unitary switching cell designated by CL.

Such a unitary cell CL is shown, viewed from above, diagrammatically in FIG. 1e.

This cell CL comprises two rectilinear parallel guides, the first of which is constituted by the portions $G_{11}$, $G_{11}'$, $G_{11}''$ arranged in line with each other and the second of which is constituted by the portions $G_{21}$, $G_{21}'$, $G_{21}''$ arranged in line with each other. This cell also comprises two guide portions $G_{12}'$ and $G_{22}'$ crossing each other at an angle $4\theta$ and joined to the two parallel guides at an angle $2\theta$. Finally, the cell comprises 4 p-n junctions 10a, 10b, 10c and 10d, respectively, each formed in one of the 4 joining regions enclosing with the rectilinear guides an angle $\theta$. Grooves 12a, 12b, 12c and 12d, respectively, corresponding to the grooves 12 already described are provided in the joining regions to attain the objects of the invention in each of the four switching elements constituting the unitary cell.

When a signal $P_{IN1}$ is injected into the guide $G_{11}$, dependent upon whether the p-n junction 10a is activated or not, the beam is reflected in the guide $G_{12}'$ or continues its way in the guides $G_{11}'$ and $G_{11}''$ respectively. If the junction 10a is activated, simultaneously the junction 10c is activated to ensure that the beam propagating in the guide $G_{12}'$ is reflected by the reflecting plane constituted by this junction 10c and then propagates in the guide $G_{21}''$. Therefore, in this case switching of the first rectilinear guide formed by $G_{11}$, $G_{11}'$, $G_{11}''$ has taken place in the second rectilinear guide formed by $G_{21}$, $G_{21}'$, $G_{21}''$.

On the other hand, a signal $P_{IN2}$ injected into the guide $G_1$, depending upon whether the junctions 10d and 10b are activated or not, can either leave at $G_0''$ or leave at the prolongation $G_{21}''$ of of $G_{21}$.

This type of unitary switching cell CL permits on the one hand multiplexing of signals and on the other hand is perfectly symmetrical, which is important for certain applications in the field of telecommunication.

Unitary cells CL of the kind shown in FIG. 1e can then be grouped to form a switching matrix of N guides in N guides.

Figure 5C:
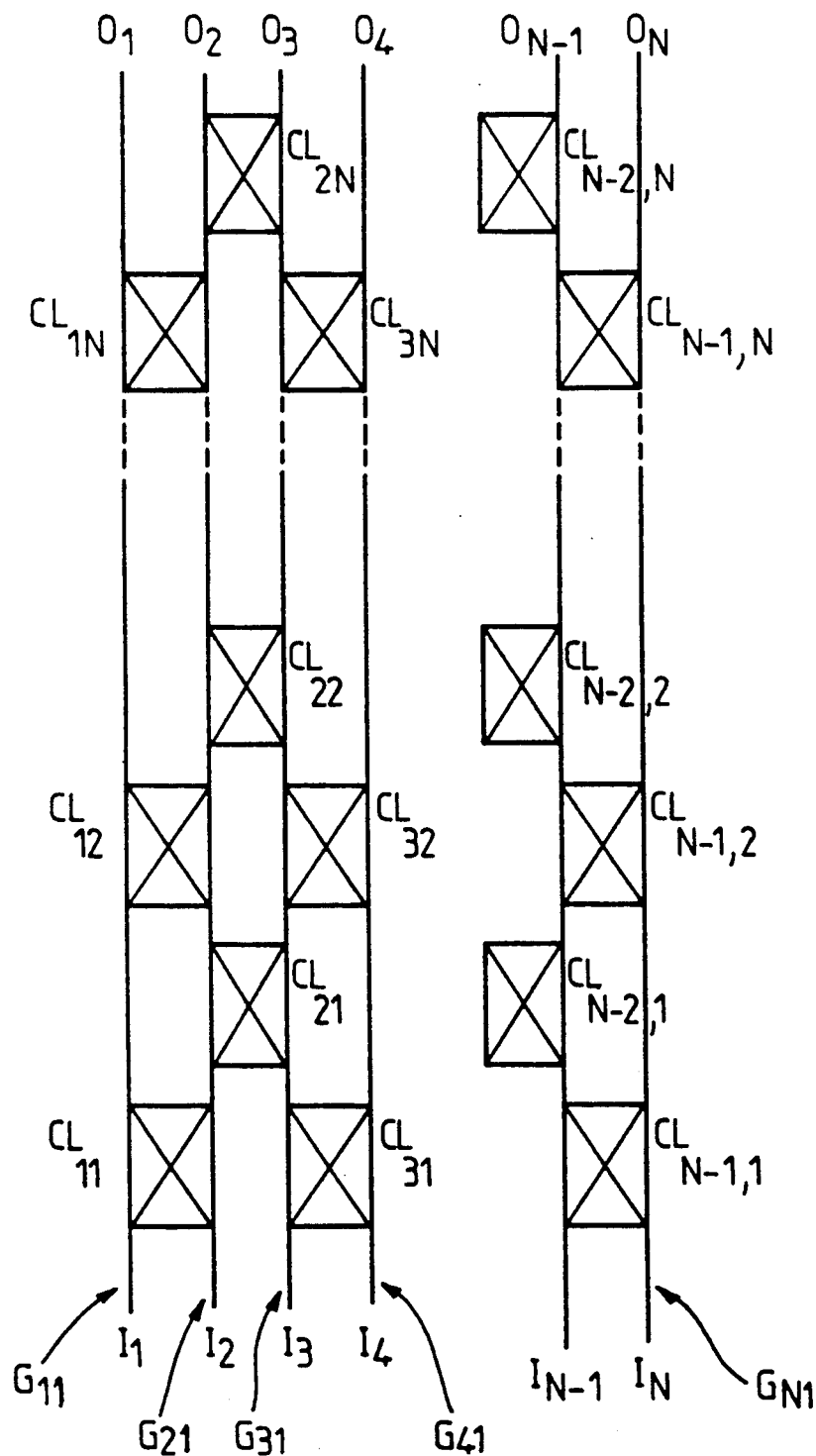
FIG. 5c shows a switching matrix of N guides in N guides composed of cells according to FIG. 1e described in Example II.

In order to obtain switching of N guides in N guides, it is necessary to arrange $N(N-1)/2$ unitary cells CL in staggered disposition between rectilinear parallel optical guides, as shown in FIG. 5c.

METHOD OF MANUFACTURING I

This method is shown in FIGS. 3a, 3b, 3d and 5a. The following method is given by way of example in the case in which switching elements according to the invention should be manufactured in a technology utilizing the double heterostructure shown in one of FIGS. 2b or 2e. This method comprises the following successive steps:

a) forming a substrate S of indium phosphide InP, which is semi-isolating and has, for example, the form of a wafer obtained by cutting a solid block of InP in turn obtained by drawing by the Czochralski method by liquid encapsulation (FIG. 3a or 3d);

b) forming a mask designated by XB in FIGS. 3 and 5a limiting the surface of the future layer $C_1$ and especially having an edge BB' in exact coincidence with the future plane of symmetry YY' of the crossing region and then implanting in the opening of said mask ions, such as Si ions, suitable to form a layer $C_1$ of the n-type in the upper part of the substrate. In order to obtain a layer uniformly implanted over a thickness of about 1 μm, two successive implantations can be carried out at different energies and then an annealing treatment can be effected. A uniform layer doped with about $10^{18}$ ions/cm$^3$ and having vertical edges, i.e. at least one edge BB' accurately coinciding with YY', is then obtained. The dimension of the layer $C_2$ parallel to the axis YY' will preferably be $\Delta'=400$ μm and in the perpendicular sense $d_1 \approx 100$ μm (FIGS. 3a, 3d);

c) forming by liquid phase epitaxy preferably a layer 2 of $Ga_xIn_{1-x}As_yP_{1-y}$, where $y \approx 0.5$ $x \approx 0.435\ y$.

If the epitaxy is realized by VPE, in this step openings can be reserved for forming later the contact pads $E_1'$ and $E_1''$. For this purpose, a protective layer of dielectric, for example of silica, is deposited in the opening of a mask XH. By the VPE method, the quaternary material does not grow on the dielectric material and the surface of the future opening remains free. The layer 2 will preferably have a thickness $e_G \approx 0.4$ μm. (FIGS. 3a, 3d);

d) forming at the surface of the layer 2 a layer 3 of InP obtained preferably by vapour phase epitaxy (VPE). This layer will preferably have a thickness of $H \approx 1.0$ μm;

e) etching from the layer 3 in the opening of a mask strips RB of the guides over a depth $$0.35\ \mu m \leq h \leq 0.75\ \mu m$$

to leave a guide width $a \approx 4$ μm;

f) locally deffusing in the opening of a mask XF species, such as Zn, intended to form the layer $G_2$ of the p-conductivity type. This mask XF has one of its edges offset by a distance d to the edge of the guides situated towards the junction. This distance d is chosen here to be 1 μm in order that after the local diffusion the edge of the layer $C_2$ obtained is in perfect coincidence with the axis YY' and the edge BB' of the layer $C_1$. Those skilled in the art know indeed that the diffusion always extend slightly under the mask limiting it, but that this extent is controllable and reproducible in experiments. Here attempts are made to obtain a diffusion thickness equal to the thickness:

$$H = e_3 + h.$$

This diffused layer $C_2$ will preferably have a dimension $\Delta'$ parallel to the axis YY', such as $$\Delta' = 400\ \mu m$$

and a dimension $d_2$ perpendicular to this axis, such as: $d_2 = 8$ μm to 10 μm (FIGS. 3a, 3d);

g) forming at the surface of the pads $E_1'$, $E_1''$ after elimination of the dielectric layer protecting their location and in the opening of a mask XI (cf. FIG. 3b) a layer 8 of AuGeNi alloy to form the n-type ohmic contacts;

h) protecting the surface of the device by a dielectric layer 7, for example of $SiO_2$, leaving free openings XK (cf. FIG. 3b);

i) depositing in the opening of a mask XG (cf. FIGS. 3a and 3d) a first layer 5 of TiPtAu alloy to form the p-type ohmic contacts $E_2$ and then depositing in the opening of a mask XL a second layer of this alloy to form at the surface of the dielectric layer 7 the electrical interconnection lines.

During the whole manufacturing process, at least one edge of each mask can be arranged parallel to an axis of one of the guides, except the masks XB and XF, which must obligatorily have an edge parallel to the axis of symmetry YY' of the crossing angle (cf. FIGS. 3a and 5a).

On the other hand, if the VPE growth is utilized to form the epitaxial layer, test patterns and alignment patterns can be provided on the substrate simply protected by a dielectric transparent layer. Since the VPE growth does not take place on the dielectric, these patterns are then preserved and maintained during the whole formation. This method of alignment is particularly important due to the fact that it is especially attempted to align the edge BB' of the junction with the axis YY'.

Method of Manufacturing II

The following method is given by way of example in the case in which it is desired to form switching elements having a planar structure according to FIG. 3c. This method can be used only to obtain an element in the form of an X according to Example I or an element in the form of a Y if the latter is not provided with the grooves 12 described in Example II.

It should be noted that the steps a and b are first identical to those of the method I.

Between the step B7 and the step c), a step B') is included, during which grooves are formed having a depth h and a width a at the location desired for the optical guides. The thickness of the layer 1 for forming $C_1$ must be chosen to be larger than h.

Subsequently, the steps c) and d) of the method I are chosen to be identical, but the step e) of forming erected strips is excluded because in this method II the structure of the guides is inverted, the guides then being entirely buried.

The normal steps f), g), h), i) of the method I are then carried out.

We claim:

1. An integrated semiconductor device including at least one optoelectronic switching element, this element comprising:
   two rectilinear monomode optical guides crossing each other at a predetermined angle composed of at least one heterostructure of III-V material, which comprises a substrate S of a confinement material, a guiding layer $C_G$ and a guiding strip RB,
   a p-n junction formed in the crossing region asymmetrically with respect to the bi-secting longitudinal plane of the crossing angle,
   wherein the longitudinal dimension of the p-n junction is substantially larger than that of the crossing region, and in that the p-n junction is arranged so as to project symmetrically on either side of the crossing region in the longitudinal direction.

2. A device as claimed in claim 1, characterized in that the substrate S is semi-isolating and the p-n junction is formed by two layers $C_1$ and $C_2$, respectively, of the n- and the p-conductivity type, respectively, arranged on either side of the guiding layer $C_G$ in close proximity each having an edge BB' in coincidence with the bi-secting longitudinal plane YY' of the crossing angle $2\theta$.

3. A device as claimed in claim 2, characterized in that it further includes an upper layer of a confinement material.

4. A device as claimed in claim 3, characterized in that the guiding strip is constituted by a groove formed in the substrate and filled with material of the guiding layer, the upper surface of the device then being planar.

5. A device as claimed in claim 1, characterized in that the guiding strip is erected above the heterostructure.

6. A device as claimed in claim 5, claim 3, characterized in that, the transverse dimension a of the guides is arranged so as to permit the propagation of monomode waves, the crossing angle $2\theta$ is chosen as a function of the thickness $e_G$ of the guiding layer $C_G$, of the thickness H of the upper confinement layer when it exists, of the height h of the guiding strip RB and of the composition of the materials forming the heterostructure(s) for obtaining an index difference n between the effective index in the guided region and the effective index in the adjacent regions lying between $10^{-2}$ and $10^{-3}$.

7. A device as claimed in claim 6, characterized in that the heterostructure(s) comprise(s) a quaternary layer of a III-V compound to form the guiding layer $C_G$ and (one) binary layer(s) of a III-V compound to form the substrate S and, as the case may be the upper confinement layer.

8. A device as claimed in claim 7, characterized in that the binary compound in InP and the quaternary compound is $Ga_xIn_{1-x}As_yP_{1-y}$, where x and y are the concentrations connected with each other by the relation x = 0.435 y.

9. A device as claimed in claim 8, characterized in that the concentration $$y \approx 0.1 \text{ to } 0.5$$

the width of the guiding strip RB $$a \approx 3 \text{ to } 5 \ \mu m$$

the thickness of the guiding layer $$e_G \approx 0.4 \ \mu m$$

and the crossing angle $$2\theta \approx 2 \text{ to } 6°.$$

10. A device as claimed in claim 9, characterized in that
$$y \approx 0.5$$
$$a \approx 4 \ \mu m$$
$$2\theta \approx 4°.$$

11. A device as claimed in claim 9, characterized in that the overall height of this layer above the guided region is $$H = h + e_3 \approx 1.0 \ \mu m$$

where h is the height over which the strip RB is erected and where the thickness $e_3$ of the confinement layer on either side of the strip is $$e_3 \approx 0.25 \text{ and } 0.60 \ \mu m.$$

12. A device as claimed in claim 11, characterized in that the transverse dimension of the upper layer of the p-n junction is $d_2 < d_1$, and in that $$3 \ \mu m < d_2 < 8 \ \mu m,$$

and in that the thickness of the layer $C_1$ is of the order of 1 Mm.

13. A device as claimed in claim 1, characterized in that ohmic contact layers are arranged at the surface of the layers of the n- and p-type respectively, as the case may be by means of openings provided in the upper layer according to a configuration of pads suitable to permit the injection of charge carriers at the centre of the p-type layer and their extraction from the n-type layer symmetrically with respect to their injection.

14. A device as claimed in claim 1, characterized in that it has the form of an X having two input branches and two output branches, each of the two making an angle with the other of $2\theta$.

15. An integrated semiconductor device including an optical switching matrix of N guides in N guides, characterized in that it comprises for forming this matrix N switching elements as claimed in claim 14 arranged in a staggered disposition, each element being arranged with respect to the other elements in such a manner that the paths transporting the non-switchable signals are in line with each other, the paths transporting the switchable signals are in line with each other and the reflecting planes are orientated in the same manner.

16. A device as claimed in claim 1, characterized in that it has the form of a Y having an input formed by a said first branch of one of the two rectilinear guides, having a first output formed in the rectilinear prolongation of the input guide, and having a second output formed in the part of the rectilinear guide enclosing the angle $2\theta$ with the first output, the asymmetrical p-n junction being arranged in a disposition in which its surface passes through the first input branch and the first output branch, which are in straight line with each other.

17. An integrated semiconductor device including a unity switching cell of two guides in two guides, characterized in that this cell is constituted by four switching elements as claimed in claim 16, these elements being arranged in such a manner that the said third and fourth elements are joined by the front and the back to the first and second elements, respectively, the said first output guides of each pair thus joined together being arranged so as to be in line with each other and forming a rectilinear guide, the rectilinear guides of two adjacent pairs being parallel to each other and the said second output guides of the four elements being joined to each other to form two rectilinear guides which cross each other at X at an angle $4\theta$, the p-n junctions of the said first and fourth elements on the one hand and the p-n junction of the said second and third elements on the other hand being connected to each other through electrical connections.

18. A device as claimed in claim 16, characterized in that on the one hand the guiding strip has a rectangular section and on the other hand a groove of rectangular section is provided along the input guide so that it has an edge in common with the guiding strip of the latter and through the second output guide.

19. A device as claimed in claim 18, characterized in that the groove has a depth equal to the height of the guiding strips of the guides.

20. A device as claimed in claim 19, characterized in that the transverse dimension $d_3$ of the said groove is arranged in conjunction with the value of the crossing angle $2\theta$ and the value of other waveguide parameters to obtain an extinction of at least 30 dB in the unused path in the passive mode.

21. A device as claimed in claim 20, characterized in that the value of the current density in the p-n junction is chosen so as to obtain an extinction of at least 30 dB in the unused path in the active mode corresponding to an index difference produced by the junction of the order of $1.4 \cdot 10^{-2}$.

* * * * *